(12) United States Patent
Hatemata et al.

(10) Patent No.: US 7,760,068 B2
(45) Date of Patent: Jul. 20, 2010

(54) OPERATION SWITCH WIRING MECHANISM

(75) Inventors: Takeshi Hatemata, Kadoma (JP);
Takashi Yoshida, Kadoma (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 1317 days.

(21) Appl. No.: 11/246,142

(22) Filed: Oct. 11, 2005

(65) Prior Publication Data

US 2006/0089726 A1 Apr. 27, 2006

(30) Foreign Application Priority Data

Oct. 26, 2004 (JP) .............................. 2004-311497

(51) Int. Cl.
*G05B 23/02* (2006.01)
(52) U.S. Cl. ............... 340/3.1; 340/825.37; 340/825.52
(58) Field of Classification Search ............ 340/825.37, 340/825.52, 3.1, 825.21, 825.29, 5.1
See application file for complete search history.

(56) References Cited

U.S. PATENT DOCUMENTS

| | | | |
|---|---|---|---|
| 5,862,405 A | | 1/1999 | Fukuda et al. |
| 5,866,992 A | * | 2/1999 | Geiginger et al. ...... 340/825.52 |
| 2005/0286196 A1 | | 12/2005 | Hatemata |

FOREIGN PATENT DOCUMENTS

| | | |
|---|---|---|
| JP | 2-108493 | 8/1990 |
| JP | 6-303681 | 10/1994 |

OTHER PUBLICATIONS

English Language Abstract of JP 6-303681.
U.S. Appl. No. 11/186,880 to Yoshimura, filed on Jul. 22, 2005.
U.S. Appl. No. 11/186,881 to Kawamata, filed on Jul. 27, 2005.

\* cited by examiner

*Primary Examiner*—Vernal U Brown
(74) *Attorney, Agent, or Firm*—Greenblum & Bernstein, P.L.C.

(57) ABSTRACT

A small-sized operation switch wiring mechanism which can easily set an address without using an address setting device. The operation switch wiring mechanism includes a device body formed at three-module size. Disposed on the front surface of the device body are operation buttons which cover operators of eight operation switches individually assigned with addresses corresponding to the addresses of relays, and an operator of a rotary switch which alternatively selects a combination of the addresses of the operation switches among a plurality of combinations. In the device body, a signal processor transmits a transmission signal including operation information due to the manipulation of the operation switch, and the address of the manipulated operation switch to a signal line is received. A face cover that covers the entire front surface is detachably attached to the front surface of the device surface.

12 Claims, 18 Drawing Sheets

Fig. 1
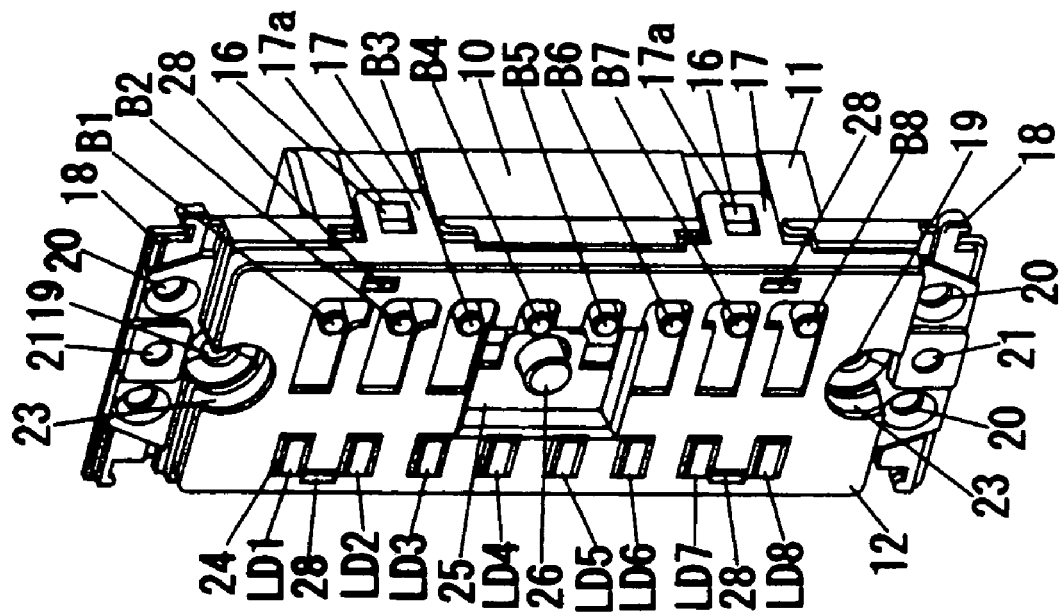
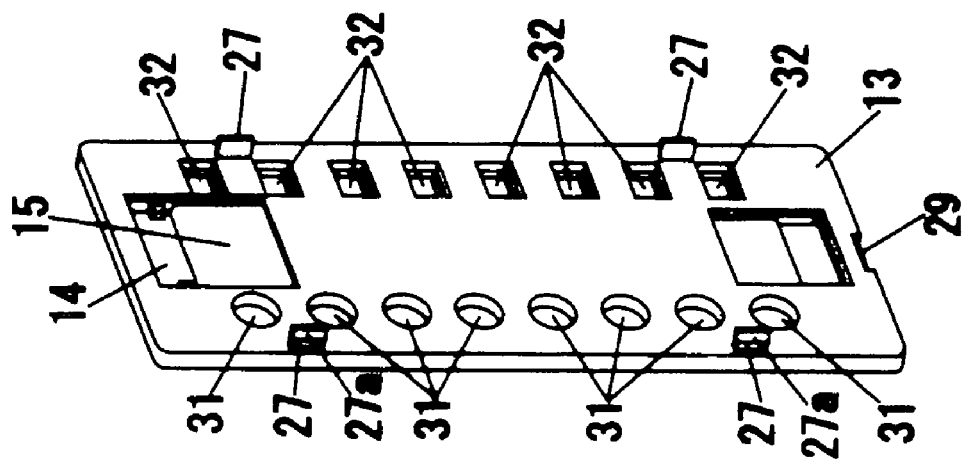

Fig. 8
(a)
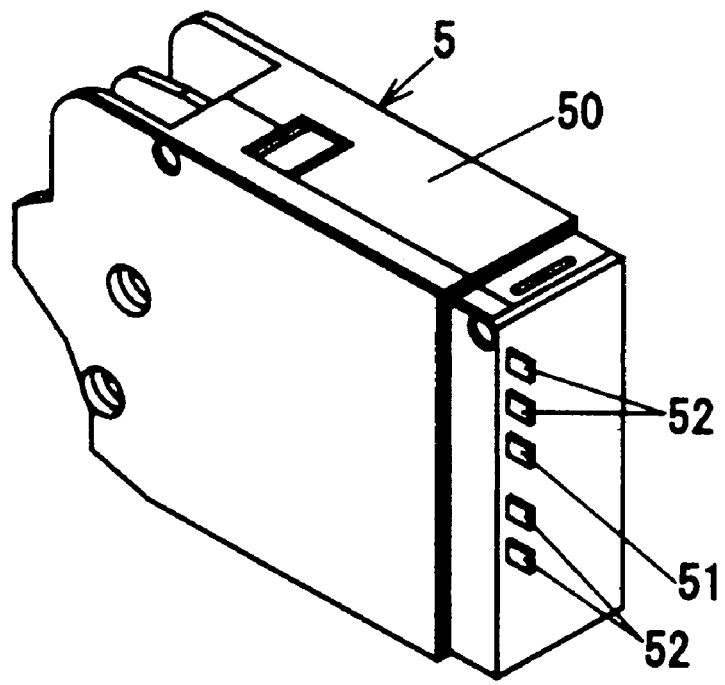
(b)
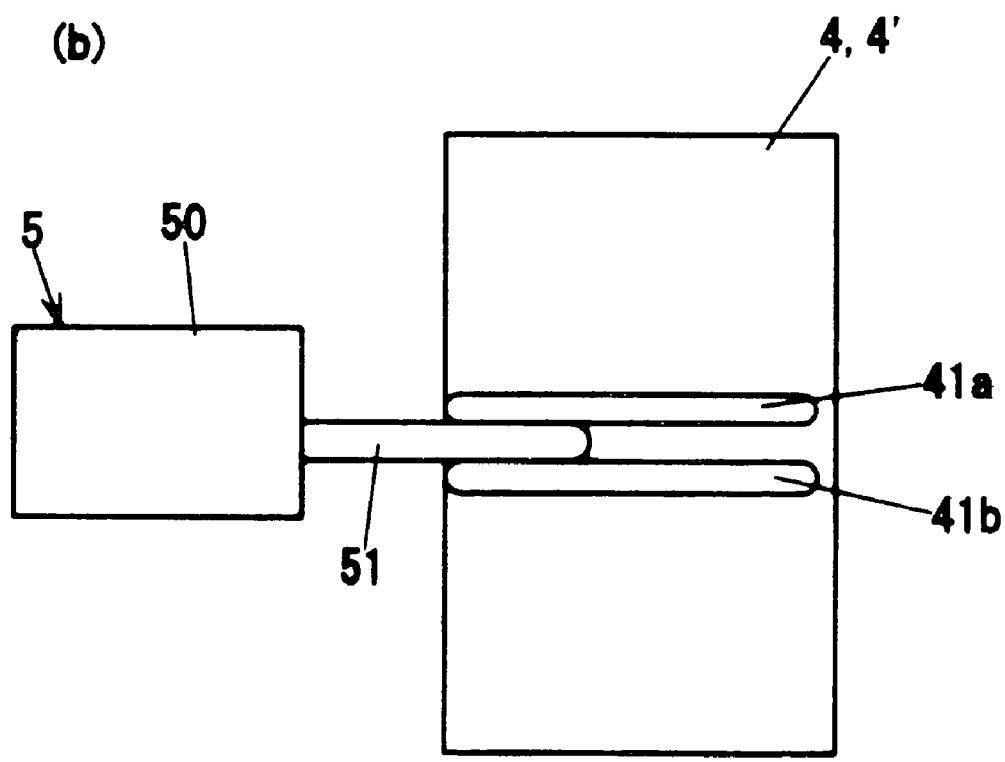

OPERATION SWITCH WIRING MECHANISM

BACKGROUND OF THE INVENTION

1. Field of the Invention

The present invention relates to an operation switch wiring mechanism used in a remote monitoring and control system which performs remote monitoring and control with respect to loads such as lighting instrument.

2. Description of the Related Art

Conventionally, for remote monitoring and control of a load, it is known that a technology transmits a transmission signal including ON/OFF information of a switch via a signal line and turns on/off a relay for supplying power to the load based on the transmission signal.

Such a remote monitoring and control system, for example, as shown in FIG. 16, includes a transmission unit 100, an operation terminal 101 for monitoring a state of an operation switch 103, and a control terminal 102 for turning on/off the load such as a lighting instrument by a contact (not shown) of a relay 104, which are connected to each other through a two-wire signal line 105. In this system, the transmission unit 100 individually identifies the operation terminal 101 and the control terminal 102 using individual addresses which are set to the operation terminal 101 and the control terminal 102. In FIG. 16, reference numeral 106 denotes a power supply transformer for driving the relay 104.

In this remote monitoring and control system, the transmission unit 100 transmits a transmission signal Vs having a form shown in FIG. 17(a) to perform data transmission/reception with each of the terminals 101 and 102. The transmission signal Vs is a bipolar time division multiplex signal (±24 V) including a start pulse ST representing transmission start of a signal, a mode data MD representing a mode of the signal, an address data AD for individually identifying each of the terminals 101 and 102, a control data CD representing a control content of a load, an error correcting symbol CS for detecting an transmission error, such as checksum data, and a carrying standby period WT for carrying a carrying signal from each of the terminals 101 and 102, and data is transmitted by pulse width modulation.

In the each of the terminals 101 and 102, when an address included in the address data AD of the transmission signal Vs received via the signal line 105 is identical to its own address which is previously set, the control data CD from the transmission signal Vs is received and the data as a current mode signal (signal transmitted by short-circuiting the signal line 105 through an adequately low impedance) is carried in the carrying standby period WT of the transmission signal Vs.

In the operation terminal 101, when the operation switch 103 is manipulated, an interrupt signal Vi is transmitted as a current mode as shown in FIG. 17(c), in a period of receiving the start pulse ST of the transmission signal Vs which is usually transmitted as shown in FIG. 17(b). If the transmission unit 100 includes a signal transmission means and an interrupt processing means, the mode data MD is set to a polling mode by the signal transmission unit, the transmission signal Vs having the address data AD of a dummy or a terminal which is always monitored is always transmitted, and the interrupt signal Vi which is transmitted from the operation terminal 101 by the manipulation of the operation switch 103 in synchronization with the start pulse ST of the transmission signal Vs of this mode is received, the interrupt processing means sequentially transmits the transmission signal Vs having a group address for identifying the operation terminal 101 in a unit of group and detects the operation terminal 101 which transmits the interrupt signal Vi.

At this time, the operation terminal 101, which transmits the interrupt signal, carries its own address as the carrying signal in the carrying standby period WT in order to access its own group address. The transmission unit 100, which receives this carrying signal, detects the operation terminal 101 which transmits the interrupt signal Vi on the basis of the transmitted address data, transmits the transmission signal Vs for accessing the operation terminal 101, and carries operation data of the operation switch 103 from the operation terminal 101 as a monitoring data by the carrying signal in the carrying standby period WT.

After the above-described interrupt process, the transmission unit 100 prepares the control data CD of the control terminal 102 in which correspondence is previously set based on the monitoring data and transmits the control data CD together with the address data AD of the control terminal 102 by the transmission signal Vs in a time division multiplex manner. The control terminal 102 accessed by the transmission signal Vs controls the relay 104 and turns on/off the power of the load through the contact of the relay.

In this remote monitoring and control system, the load can be turned on/off through the relay 104 of the corresponding control terminal 102, in accordance with the manipulation of the operation switch 103 of the operation terminal 101.

In the above-described remote monitoring and control system, the transmission unit 100 includes a memory for storing a control table which is a data table for making the operation terminal 101 correspond to the control terminal 102 by the address. When ON/OFF information of the operation switch 103 of any one operation terminal 101 is notified to the transmission unit 100 using the transmission signal Vs, an instruction for turning on/off the relay 103 using the transmission signal is transmitted to the control terminal 102 corresponding to the operation terminal 101 by the control table, and the relay 104 of the control terminal 102 which receives the instruction is turned on/off. Here, one operation terminal 101 can identify four circuits of the operation switches 103 in maximum and one control terminal 102 can identify of four circuits of the relays 104 in maximum. In the control table provided in the transmission unit 100, the operation switch 103 and the relay 104 correspond to each other in a unit of circuit. Also, in the control table, the operation switch 103 and the relay 104 are connected to each other in one-to-multiple correspondence as well as in one-to-one correspondence.

For example, when the lighting instrument as the load is turned on/off using the relay 104, the transmission unit 100 can be set in order to perform the function of individual control that one circuit of lighting instrument is turned on and off with one switch or the function of collective control that plural circuits of lighting instruments are turned on and off with one switch. That is, the individual control means that one circuit of load is controlled by one instruction and the collective control means that plural circuits of loads are controlled by one instruction. The collective control is classified into group control that the a range of loads to be controlled is caused to correspond to a switch and the loads in the range are turned on or off at a time by means of manipulation of the switch and pattern control that a range of addresses of the loads to be controlled and ON and OFF states of the loads corresponding to the respective addresses are caused to correspond to a switch and the loads in the range are individually turned on or off by means of manipulation of the switch.

Conventionally, there was provided an address setting device for setting the address of the control terminal 102 controlled by the collective control such as the group control or the pattern control (for example, see Patent Document 1 or Patent Document 2). However, the number of the system components except the operation terminal 101 or the control terminal 102 increases. Also, since the address setting device is used only at the time of setting the address, an unnecessary system component increases in a general control.

Accordingly, conventionally, there was provided a technology of changing the address assigned to the operation switch 103 in the operation terminal 101 and controlling the load without using the address setting device. For example, in a selector switch 110 shown in FIG. 18(a), a plurality of selector keys 111 for controlling the load are included and the address of each of the selector keys 111 is set by various kinds of the operation switches including a setting switch portion 112. Furthermore, as shown in FIG. 18(b), a selector switch 120 including a liquid crystal panel 121 is provided, and the liquid crystal panel 121 has a touch switch. By manipulating an operation button provided on a screen of the liquid crystal panel 121, a pattern address or a group address is set.

[Patent Document 1] Japanese Utility Model Laid-Open No. 2-108493

[Patent Document 2] Japanese Patent Laid-Open No. 6-303681

In the above-described remote monitoring and control system, when the address of the operation terminal 101 is changed to change the correspondence with the address of the relay 104 without using the address setting device, the selector switch 110 including the plurality of the selector keys 111 and the setting switch portion 112 for setting the addresses of the respective selector keys 111, or the selector switch 120 including the liquid crystal panel 121 having the touch switch is used. However, the selector switch 110 or 120 is, for example, provided in a control office and used for controlling the lighting load of the entire system. To this end, since the selector switch 110 or 120 has many functions such as the pattern control or the group control, it has a large size and a high cost. In addition, since the setting manipulation is complex, it is difficult for an unskilled person to set the address.

Furthermore, conventionally, as shown in FIG. 18(c), a 4-bit deep switch DS for setting the address is mounted on the rear surface of the operation terminal 101 which is buried in a building surface and the address is set by the manipulation of the deep switch DS. In this case, the address can be easily set before burying the operation terminal 101, but the setting of the address can not be changed without taking off the operation terminal 101, because the deep switch DS is hidden in a construction surface.

SUMMARY OF THE INVENTION

The present invention is contrived to solve the above-mentioned problems and it is an object of the present invention to provide a compact operation switch wiring mechanism which can easily set an address without using an address setting device.

According to a first aspect of the present invention, there is provided an operation switch wiring mechanism used in a remote monitoring and control system in which the operation switch wiring mechanism for monitoring ON/OFF of operation switches assigned with individual addresses and a remote control wiring mechanism for controlling ON/OFF of relays assigned with individual addresses are connected to each other through a signal line, the operation switch wiring mechanism outputs a transmission signal including address information and operation information due to the manipulation of the operation switches, and the remote control wiring mechanism turns on/off the relay having the address corresponding to the address of the operation switch, comprising: a device body which is formed at the substantially same size as the size of three wiring mechanisms of unit size which are arranged in a short width direction and can be attached to a series of mounting frames standardized for the flush type wiring mechanism, and buried in a construction surface in a state that the front surface thereof is exposed, wherein a plurality of operation switches which are individually assigned with addresses corresponding to the addresses of the relays and an address setting unit which alternatively selects a combination of the addresses of the operation switches are disposed at the front surface of the device body, a signal processing unit which transmits the transmission signal including the operation information due to the manipulation of the operation switch and the address information of the manipulated operation switch to the signal line is received in the device body, and a face cover for covering at least the address setting unit is detachably attached to the front surface of the device body.

According to a second aspect of the present invention, in the first aspect, a display means for displaying an address setting content due to the address setting unit is mounted on the front surface of the device body.

According to a third aspect of the present invention in the first aspect or the second aspect, the operation switch wiring mechanism further comprises: a means for receiving the address information of the relay, which is transmitted by the transmission signal through the signal line, connected to the remote control wiring mechanism; and a means for comparing the received address information of the relay with the addresses of the plurality of operation switches set in the address setting unit and displaying setting error when the relay having the address corresponding to the set address does not exist.

According to a fourth aspect of the present invention, in one of the first through third aspects, the operation switch is assigned with the address corresponding to the addresses of the plurality of relays in one-to-multiple correspondence, and the face cover includes an operation handle for manipulating the operation switch.

According to a fifth aspect of the present invention, in the fourth aspect, the address setting unit alternatively selects a combination of a leading address, a last address, one or a plurality of addresses which exist between the leading address and the last address among the addresses of the relays, and the leading address and the last address can be individually and manually set.

According to a sixth aspect of the present invention, in the fourth aspect, the address setting unit can manually set correspondence between the addresses of the operation switches and all the addresses of the relays.

BRIEF DESCRIPTION OF THE DRAWINGS

The above and other features and advantages of the present invention will become more apparent by describing in detail exemplary embodiments thereof with reference to the attached drawings in which:

FIG. 1 is a perspective view of an operation switch wiring mechanism according to a first embodiment of the present invention in a state that a face cover is detached;

FIG. 8 illustrates a relay block which will be used in a third embodiment of the present invention, where FIG. 8(a) is a perspective view of an appearance of the relay block and FIG. 8(b) illustrates a connection portion between the relay block and a main body unit;

FIG. 10(a) is a front view thereof and FIG. 10(b) is a right side view thereof;

FIG. 11(a) is a partial front view thereof and FIG. 11 (b) and 11 (c) are front views of a main portion;

FIG. 14(a) is a partial front view thereof and FIG. 14(b) and 14(c) are front views of the main portion;

DETAILED DESCRIPTION OF THE INVENTION

Hereinafter, embodiments of the present invention will be described with reference to the attached drawings.

First Embodiment

Figure 6:
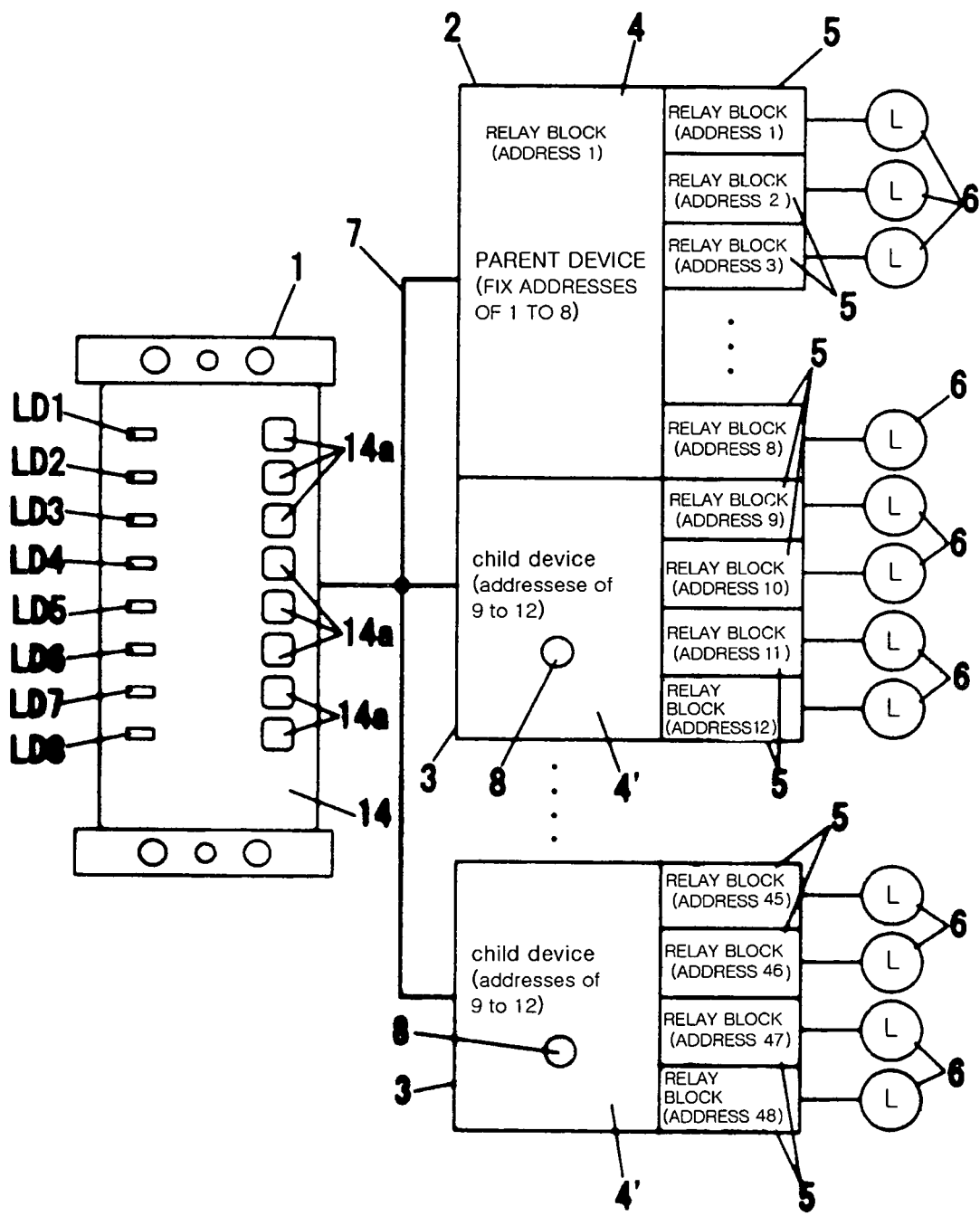
FIG. 6 is a block diagram of a remote monitoring and control system using the first embodiment.
Figure 16:
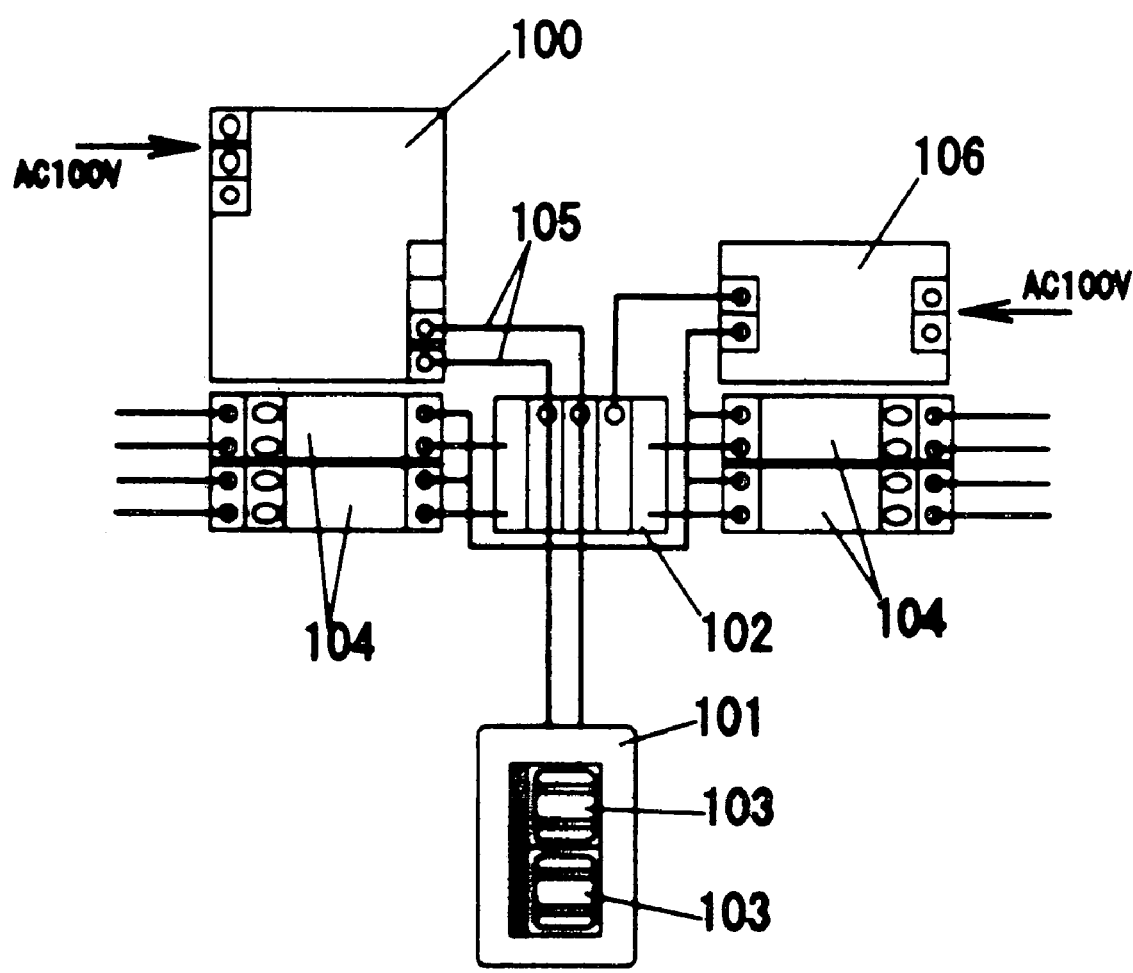
FIG. 16 is a block diagram schematically illustrating a conventional remote monitoring and control system.
Figure 17:
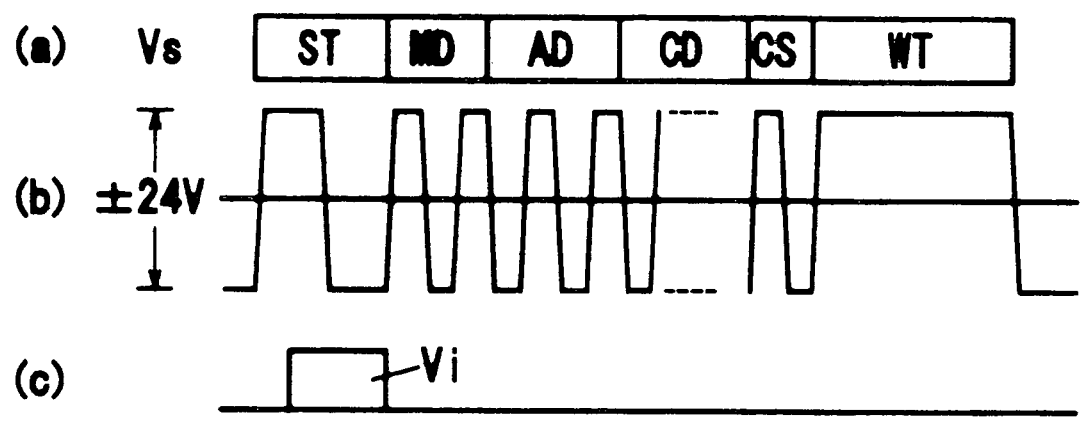
FIG. 17 illustrates a transmission signal of the conventional system.
Figure 18:
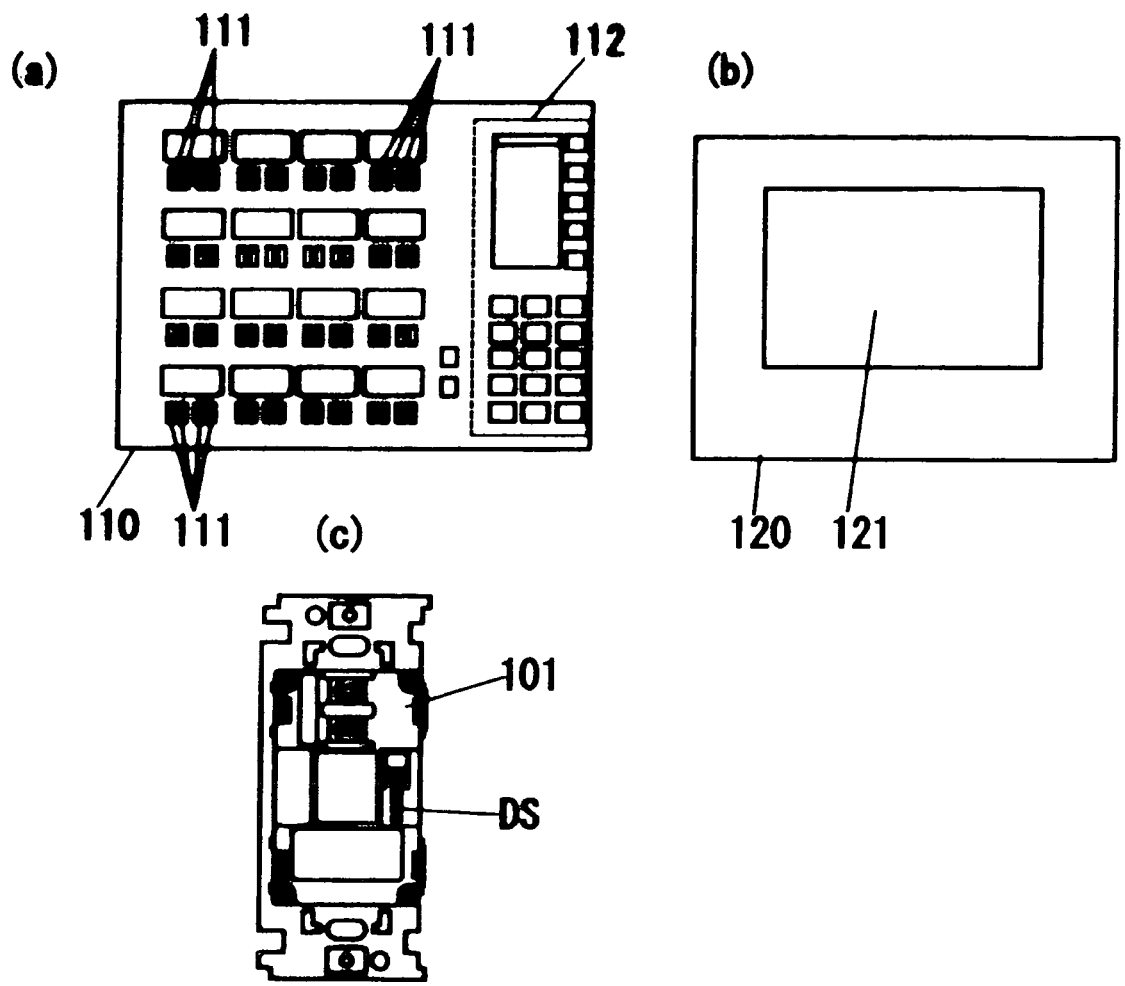
FIGS. 18(a) to 18(c) illustrate a conventional operation terminal.

First, an overview of a remote monitoring and control system using the present embodiment will be described based on an entire configuration shown in FIG. 6. This system includes an operation switch wiring mechanism 1 having the function of the operation terminal 101 of the remote monitoring and control system shown in FIG. 16, a relay control parent device 2 (hereinafter, referred to as "parent device") having the function of the transmission unit 100, and a plurality of relay control child devices (hereinafter, referred to as "child device") not having the function of the transmission unit 100 and having the function of the control terminal 102, which are connected to each other through a two-wire signal line 7. As the supervisory remote control mechanism, the parent device 2 and the child device 3 are composed by detachably connect relay blocks 5 to main body units 4 and 4', and each of the relay blocks 5 includes a relay for turning on/off a corresponding load 6.

The parent device 2 includes the function of the transmission unit 100 and is connected to the operation switch wiring mechanism 1 through the two-wire signal line 7 such that the relay included in the relay block 5 of the parent device 2 can be turned on/off by the manipulation of a plurality (for example, eight) of operation switches SW1 to SW8 provided in the operation switch wiring mechanism 1. In addition, since the child device 3 has the function of the control terminal 102, if the child device 3 is connected to the parent device 2 connected to the operation switch wiring mechanism 1 using the signal line 7, the relay included in the relay block 5 of the child device 3 can be turned on/off by the manipulation of eight operation switches SW1 to SW8 provided in the operation switch wiring mechanism 1.

Here, eight relay blocks 5 can be connected to the parent device 2 in maximum and the addresses of the relay blocks 5 connected to the parent device 2 are fixed to 1 to 8. In addition, the relay blocks 5 are continuously connected to the main body unit 4 in a line, and, in the addresses of the relay blocks 5, the address of the relay block 5 which is connected to one end of the main body unit 4 is 1 and the address of the $n^{th}$ relay block 5 is N(N=1, 2, 3, ..., 8).

Furthermore, in the present system, ten child devices 3 can be connected to the parent device 2 in maximum and four relay blocks 5 can be connected to each child device 3 in maximum. The addresses of the relay blocks 5 connected to the child device 3 are set using rotary switches 8 provided in the child device 3. That is, if the addresses of the four relay blocks 5 connected to each child device 3 are set to serial numbers and n (an integer from 1 to 10) is a value determined depending on the rotation position of the rotary switch 8, a leading address is determined to (4×n+5) depending on the rotation position of the rotary switch 8. Accordingly, the addresses of the four relay blocks 5 connected to each child device 3 are set to any one combination of 9 to 12, 13 to 16, 17 to 20, ..., and 45 to 48.

In a maximum configuration, this system includes one parent device 2 and ten child devices 3, the parent device 2 has eight relay blocks 5, and each of the child devices 3 has four relay blocks 5. Total 48 relay blocks 5 are connected and the addresses thereof are set to the numbers of 1 to 48.

Next, a configuration of the operation switch wiring mechanism 1 according to the present invention will be described with reference to FIGS. 1 to 5. FIG. 5 is a circuit block diagram of an operation switch wiring mechanism 1, which mainly includes a control unit 1a composed of a microcomputer, an operation inputting unit 1b composed of eight operation switches SW1 to SW8, an address setting unit 1c composed of a rotary switch RS, a signal inputting unit 1d which receives a transmission signal through the signal line 7, a signal outputting unit 1e which transmits the transmission signal through the signal line 7, a display unit 1f composed of eight light-emitting diodes LD1 to LD8 which are provided in correspondence with the operation switches SW1 to SW8, and a power supply unit 1g which generates an internal power by full-wave rectifying the bipolar transmission signal Vs transmitted through the signal line 7.

Figure 4:
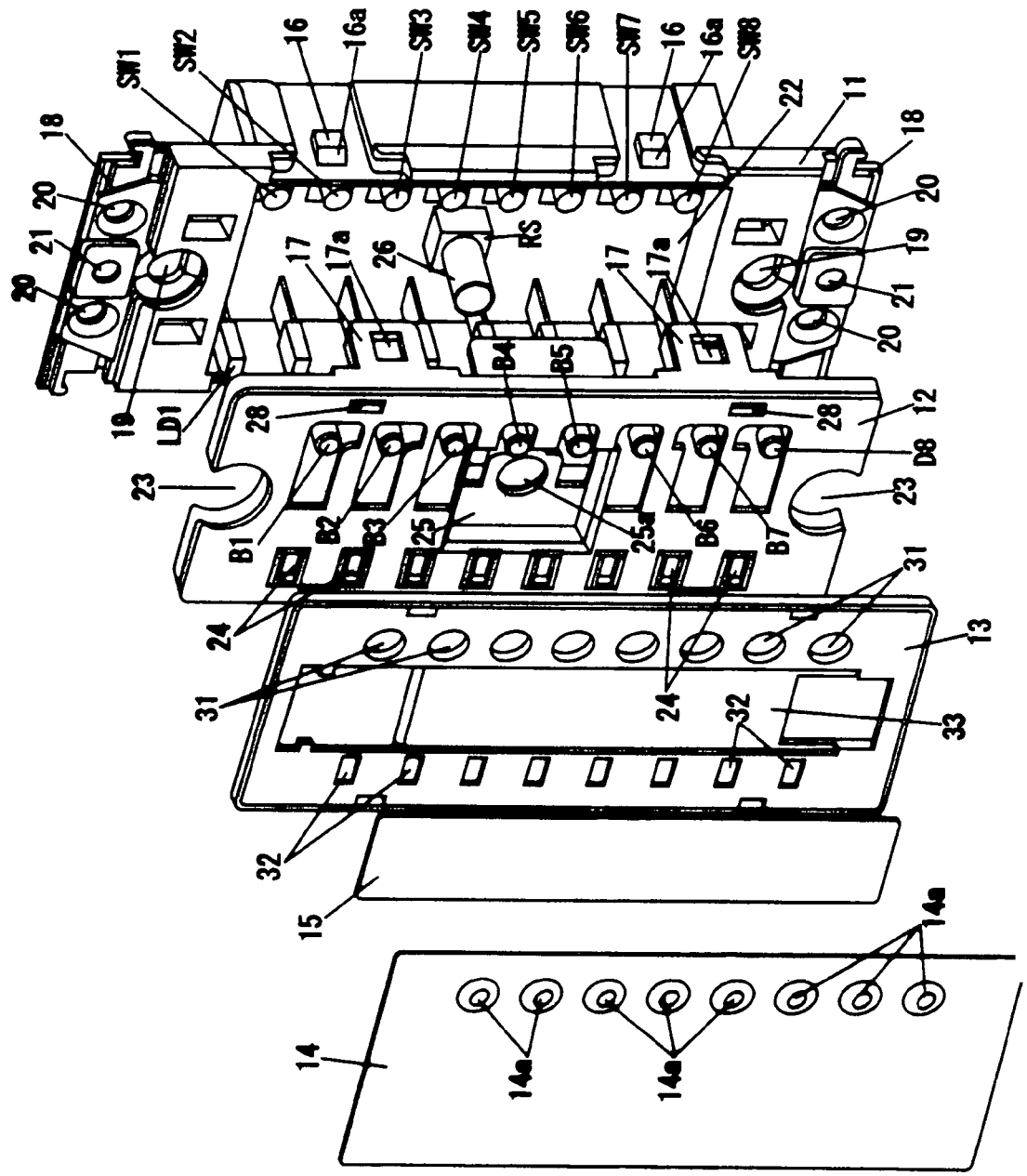
FIG. 4 is an exploded perspective view of the first embodiment.
Figure 5:
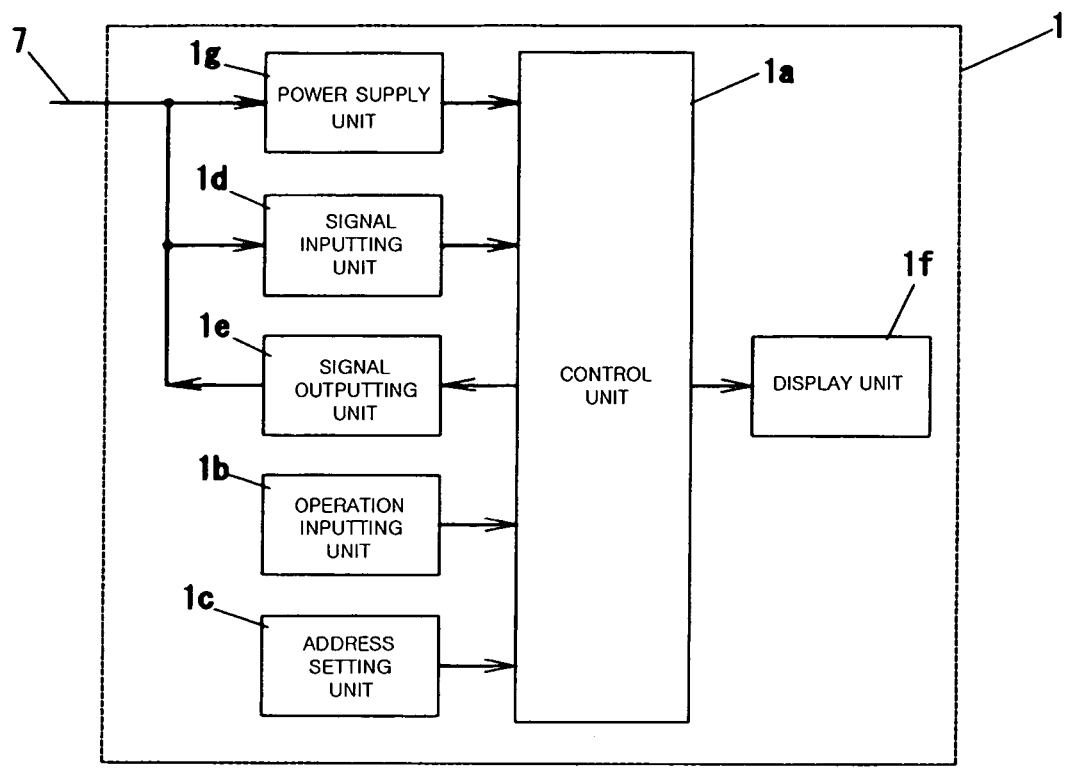
FIG. 5 is a circuit block diagram of the first embodiment.

FIG. 4 is an exploded perspective view of the operation switch wiring mechanism 1. A device body 10 of the operation switch wiring mechanism 1 is composed by coupling a body 11 made of synthetic resin and a cover 12, and a face cover 13 made of synthetic resin is detachably attached to the front surface of the cover 12. The device body 10 is formed at the substantially same size as the size (three-module size) of three flush type wiring mechanisms of unit size which are arranged in a short width direction and can be attached to a series of mounting frames standardized for the flush type wiring mechanism, and is buried in the construction surface in a state that the front surface thereof is exposed.

The body 11 has a vertically elongate box shape having an opening formed in the front surface, and a pair of engaging protrusions 16, which are vertically spaced from each other, is protruded from the both lengthwise sides of the body 11. The cover 12 has a rectangular plate shape for closing the opening of the body 11, and a pair of assembling tongues 17 extends from the back edges of the both lengthwise sides backwardly. The engaging protrusions 16 are coupled to engaging holes 17a provided in the assembling tongues 17 to couple the cover 12 with the body 11. Furthermore, the engaging protrusions 16 can be easily coupled to the assembling tongues 17 by elasticity of the assembling tongues 17 and tapers 16a provided at one end of the engaging protrusions 16.

Mounting pieces 18 and 18 extend from the front edges of the upper and lower sides of the body 11 upwardly and downwardly, respectively, and each of the mounting pieces 18 has an elongate hole 19 for passing through a box screw to be set to a flush type box (not shown) buried in the construction surface, a screw inserting hole 20 into which a mounting screw for directly attaching the body 11 to a wall is inserted, and a plate screw hole 21 for attaching a plate frame (not shown) having a window hole which exposes the face cover 13 in the front surface.

In the body 11, a circuit board 22 composed of a printed circuit board 22 on which circuit components such as the operation switches SW1 to SW8 composing the units 1a to 1g shown in FIG. 5, the rotary switch RS, the light-emitting diode LD1 to LD8 are mounted is received. Also, the eight operation switches SW1 to SW8 are arranged at the right end of the circuit board 22 in a vertical direction, the eight light-emitting diodes LD1 to LD8 are arranged at the left end of the circuit board 22 in the vertical direction, and the operation switches SW1 . . . and light-emitting diodes LD1 . . . are arranged to correspond to each other at the left and right side. Further, the rotary switch RS is disposed at the center of the circuit board 22.

Figure 2:
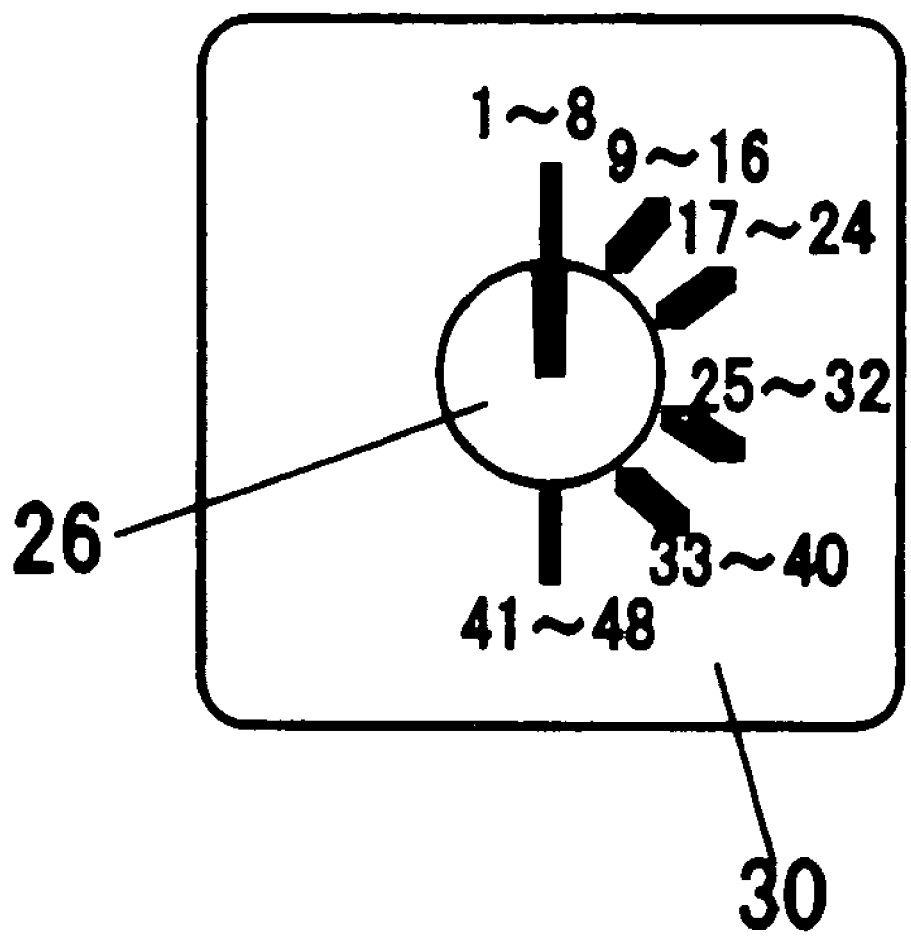
FIG. 2 is a view of enlarging a main portion of the first embodiment.
Figure 3:
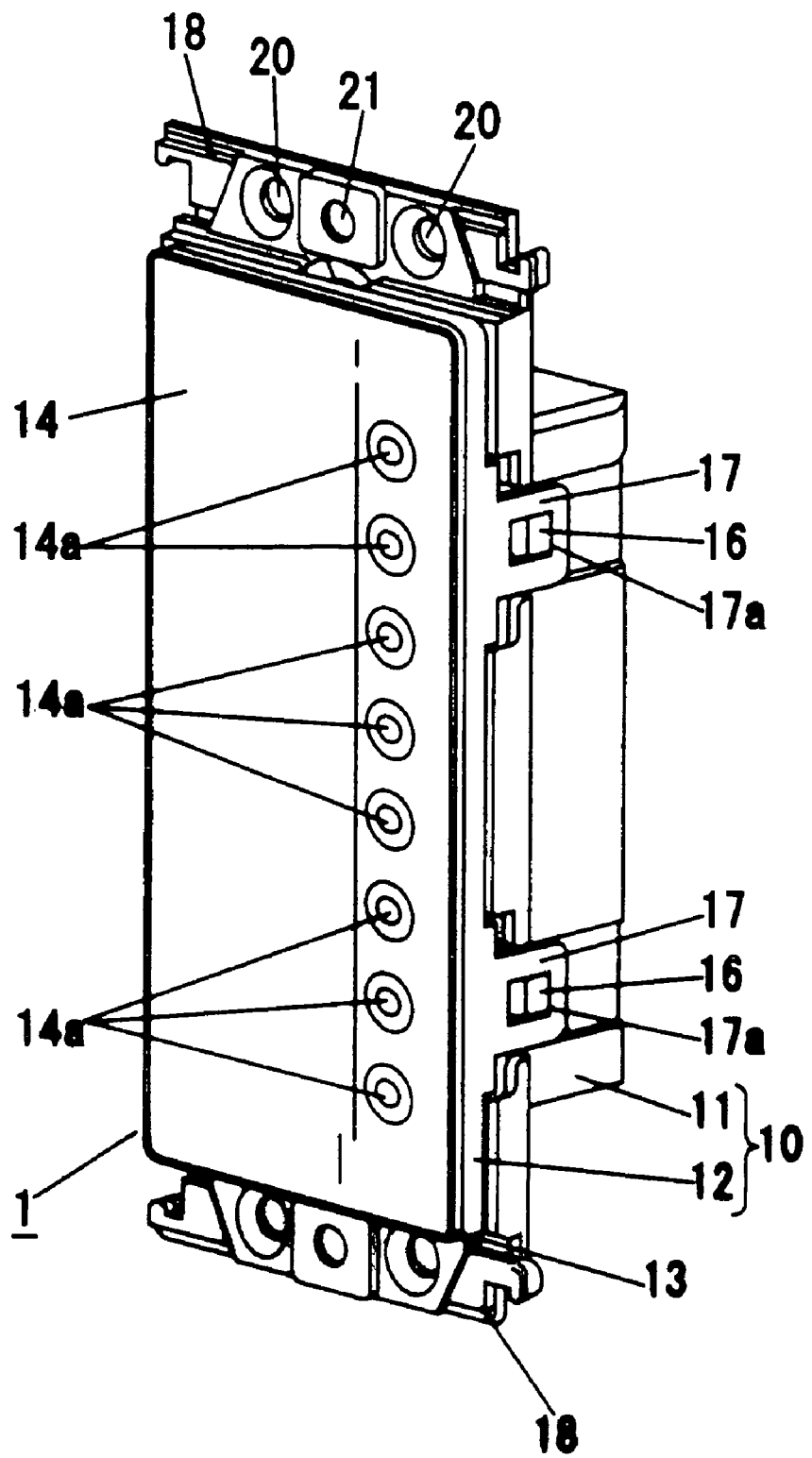
FIG. 3 is a perspective view of an appearance of the first embodiment.

The cover 12 has a size which can substantially cover the entire front surface of the body 11 except the ends of the mounting pieces 18 and 18 in which the screw inserting hole 20 and the screw hole 21 are formed. C-shaped notches 23 and 23 are formed in portions corresponding to the elongate holes 19 and 19. In addition, in the cover 12, operation buttons B1 to B8 covering operators of the operation switches SW1 to SW8 are attached to portions facing the operation switches SW1 to SW8 such that they can move in front and rear directions, and eight transmission holes 24 into which the rectangular light-emitting diodes LD1 to LD8 are inserted are formed in portions facing the light-emitting diodes LD1 to LD8. Furthermore, a rectangular concave portion 25 is formed in the center of the cover 12 and an inserting hole 25a into which an operator 26 of the rotary switch RS is inserted is formed in the bottom of the concave portion 25. In addition, an identification plate 30 shown in FIG. 2 is attached to the bottom of the concave portion 25 and the operator 26 is protruded through the central hole of the identification plate 30 forwardly. On the identification plate 30, scales representing the operation position of the operator 26 and numbers (for example, "1-8", "9-16", and so on.) representing the address which is set when the scale is changed are displayed.

Moreover, the face cover 13 has a rectangular plate shape at the substantially same size as the cover 12 in the length direction and the short width direction, and a pair of assembling claw pieces 27 is protruded from the left and right edges of the rear surface. By inserting the assembling claw pieces 27 into a pair of mounting holes 28 of the cover 12 and coupling claws 27a positioned at the front ends of the assembling claw pieces 27 to the edges of the mounting hole 28, the face cover 13 is detachably attached to the cover 12. Also, a detaching groove 29 is formed at the lower edge of the rear surface of the face cover 13. When the face cover 13 is detached from the cover 12, the claw 27a of the assembling claw piece 27 is detached from the mounting hole 28 by inserting the front end of a tool such as a flathead screwdriver into the detaching groove 29 and screwing the tool. Thus, the face cover 13 can be easily detached from the cover 12 (device body 10).

In the face cover 13, round holes 31 into which operation buttons B1 . . . are inserted are formed in portions facing the operation buttons B1 to B8 provided on the cover 12, and transmission holes 32 which expose the light-emitting surface of the light-emitting diodes LD1 . . . are at portion facing the light-emitting diodes LD1 to LD8. Also, a concave card receiving portion 33 is formed at the center of the horizontal direction of the face cover 13 and receives a name card 15. Further, on the front surface of the face cover 13, a front identification plate 14 made of flexible resin is attached in a state that the name card 15 is received in the concave card receiving portion 33. The front identification plate 14 is referred to as a membrane sheet, and has a thin plate shape having the same size as the front surface of the face cover 13 in the length direction and the short width direction. Pressing units 14a protruded toward the front side in a dome shape are formed at portions corresponding to the round holes 31 of the face cover 13. Also, a light transmitting unit having at least portions corresponding to the transmission holes 32 of the face cover 13 and a portion corresponding to the name card 15 is formed in the front identification plate 14, and light of the light-emitting diodes LD1 to LD8 or display of the name card 15 can be seen with eyes from the outside through the light transmitting unit.

Furthermore, in assembling the operation switch wiring mechanism 1, the circuit board 22 on which the circuit components are mounted is first received in the body 11, the cover 12 is covered on the front surface of the body 11, and the engaging protrusions 16 are coupled to the engaging holes 17a of the assembling tongues 17, thereby coupling the cover 12 to the body 11. At this time, the operation buttons B1 . . . , which are attached to the cover 12 such that they move in front and rear directions, cover the operators of the operation switches SW1 . . . mounted on the circuit board 22, and the operator 26 of the rotary switch RS and the light-emitting diodes LD1 to LD8 are protruded through the inserting hole 25a and the transmission holes 24 of the cover 12 forwardly, respectively. Accordingly, the face cover 13 on which the front identification plate 14 is attached at the front surface covers the front surface of the cover 12 (device body 10) in the state that the name card 15 is received in the concave card receiving portion 33, and the assembling claw pieces 27 of the face cover 13 are engaged with the mounting holes 28 of the cover 12, thereby attaching the face cover 13 to the front surface of the cover 12. At this time, when the pressing portion 14a of the front identification plate 14 is pressed, the pressing portion 14a is depressed to press the operation buttons B1 . . . through the front identification plate 14.

Here, since the eight operation switches SW1 to SW8 are provided in the operation switch wiring mechanism 1 and the addresses of the operation switches SW1 to SW8 are set in correspondence with the addresses of the above-described relay blocks 5, the ON/OFF state of the eight relay blocks 8 can be controlled depending on the manipulation of the operation switches SW1 to SW8. In the present system, since 48 relay blocks 5 can be connected in maximum, they are divided into six groups eight by eight and the relay blocks 5 of one group are manipulated by one operation switch wiring mechanism 1. Here, since the addresses of 1 to 48 are assigned to the 48 relay blocks 5, the 48 relay blocks 5 are divided into six groups depending on the address number by making, for example, the relay blocks 5 having the address numbers of 1 to 8, 9 to 16, 17 to 24, 25 to 32, 33 to 40, or 41 to 48 form one group.

In the present embodiment, continuous addresses are assigned to the eight operation switches SW1 to SW8 included in the operation switch wiring mechanism in the ascending order, the leading address (address of the operation switch SW1) is changed to eight values of 1, 9, 17, 25, 33, and 41 depending on the rotation position of the operator 26 of the rotary switch RS, and a combination of the addresses of the operation switches SW1 to SW8 is changed to any one of 1 to 8, 9 to 16, . . . , and 41 to 48.

Furthermore, when the pressing portion 14a of the front identification plate 14 is pressed and the operation switches SW1 . . . are pressed through the front identification plate 14 and the operation buttons B1 . . . , manipulation input is given from the pressed operation switches SW1 . . . to the control unit 1a, and the addresses of the pressed operation switches SW1 . . . are transmitted from the signal outputting unit 1e to the parent device 2 by the transmission signal Vs as the monitoring data after the above-described interrupt process. At this time, in the parent device 2, if the address included in the received transmission signal Vs is identical to the address of the relay block 5 connected to the parent device 2, the ON/OFF state of the relay block 5 is controlled, and, otherwise, a control signal is transmitted to the corresponding child device 3 to control the ON/OFF state of the relay block 5 having the corresponding address by the child device 3. Thereafter, since a control state of the corresponding relay block 5 is carried from the parent device 2 to the operation switch wiring mechanism 1, the control unit 1a turns on/off the light-emitting diodes LD1 . . . corresponding to the pressed operation switches SW1 . . . and thus the ON/OFF state of the relay block 5 (that is, ON/OFF state of the load 6) can be displayed.

As described above, in the present embodiment, since the combination of the addresses of the operation switches SW1 to SW8 is variously changed depending on the rotation position of the operator 26 of the rotary switch RS, the address can be easily changed by detaching the face cover 13 and manipulating the operator 26 of the rotary switch RS, and the relay blocks 5 of the number obtained by multiplying the number of the operation switches SW1 by the number of the combinations of the addresses can be manipulated by one operation switch wiring mechanism 1. Further, since the operator 26 of the rotary switch RS is detachably covered by the face cover 13 and hidden by the face cover 13 in a period except the setting period, the address can be prevented from being changed due to malfunction or mischief. In addition, since the device body 10 of the operation switch wiring mechanism 1 has the substantially same size as the flush type wiring mechanism of three-module size, the operation switch wiring mechanism 1 is more miniaturized than the conventional selector switch.

Second Embodiment

Figure 7:
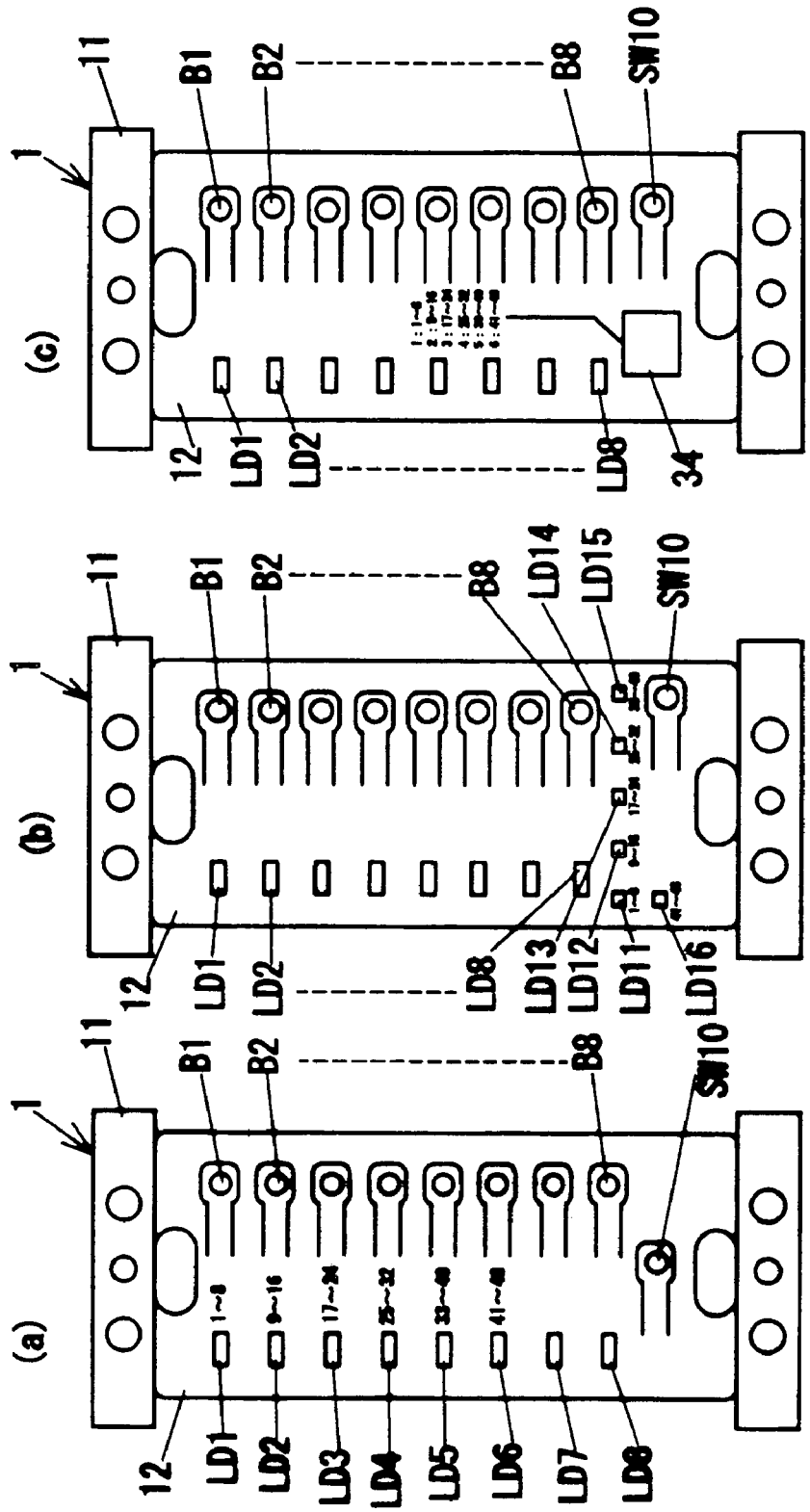
FIGS. 7(a) to 7(c) are front views of operation switch wiring mechanisms according to a second embodiment in a state that a face cover is detached, respectively.

A second embodiment of the present invention will be described with reference to FIG. 7. Since a configuration except the address setting unit 1c is similar to that of the first embodiment, like components are denoted by like reference numerals and thus their description will be omitted.

In the first embodiment, the address setting unit 1c is composed by the rotary switch RS and the combination of the addresses of the operation switches SW1 to SW8 is changed to eight values depending on the rotation position of the operator 26 of the rotary switch RS. On the contrary, in the present embodiment, a switch SW10 composed of a momentary push-button switch for setting the address is provided on the front surface of the cover 12 as shown in FIG. 7(a) and, if this switch SW10 is pressed more than a predetermined time, the switch input from the switch SW10 is received, the operation of the control unit 1a is converted into an address setting mode, and thus the switch SW10 is enabled. In the address setting mode, of the eight light-emitting diodes LD1 . . . , the light-emitting diodes LD1 to LD6 operate as a display means for displaying the address setting state. The light-emitting diodes LD1, LD2, . . . , and LD8 correspond to the address numbers of 1 to 8, 9 to 16, . . . , and 41 to 48, respectively. If the address setting mode is set by the manipulation of the switch SW10, the control unit 1a turns on the light-emitting diodes LD1 . . . corresponding to current address setting, displays the current address setting. Thereafter, whenever the switch SW10 is pressed once, the control unit 1a circularly changes the combination of the addresses in the order of 1 to 8, 9 to 16, . . . , 41 to 48, and 1 to 8 . . . , and turns on the corresponding light-emitting diodes LD1 . . . .

Furthermore, if the address setting is finished, the switch SW10 is not pressed for a long time or the manipulation of the switch SW10 is not performed for a predetermined period, and thus the control unit 1a finishes the address setting mode and progresses to a general control mode.

As such, in the present embodiment, since a displaying means for displaying the address setting state of the respective operation switches SW1 . . . is provided, a setting failure due to setting error or component malfunction can be prevented.

In addition, in the present embodiment, the light-emitting diodes LD1 to LD6 for displaying the ON/OFF state of the load 6 are also used as the displaying means of the address setting. Alternatively, as shown in FIG. 7(b), in addition to the light-emitting diodes LD1 . . . for displaying the operation of the load 6, by providing light-emitting diodes LD11 to LD16 for displaying the address setting state and always enabling the manipulation of the switch SW10, the control unit 1a may sequentially change the combination of the addresses in the order of 1 to 8, 9 to 16, . . . , 41 to 48, 1 to 8 . . . and turn on the corresponding light-emitting diodes LD11 . . . , whenever the switch SW10 is pressed once. Furthermore, as shown in FIG. 7(c), by providing a LED display 34 having seven segments for representing the combination of the addresses with a numeral instead of the light-emitting diodes LD11 to DL16 and always enabling the manipulation of the switch SW10, the control unit 1a may sequentially change the combination of the addresses in the order of 1 to 8, 9 to 16, . . . , 41 to 48, 1 to 8 . . . and change the display of the LED display 34, whenever the switch SW10 is pressed once. In this case, the display means is more compact, compared with the case of providing six light-emitting diodes LD11 . . . for displaying the address and the freedom degree of the layout of the light-emitting diodes LD1 . . . or the switches SW1 . . . is high. Here, if "1", "2", . . . , and "6" of the LED display 34 correspond to the addresses of 1 to 8, 9 to 16, . . . , and 41 to 48, the address setting state can be displayed with numerals from 1 to 6.

Third Embodiment

A third embodiment of the present invention will be described with reference to FIG. 8. In the present embodiment, a function which can not set the address to the group which is not connected with the relay blocks 5 is added to the operation switch wiring mechanism 1 described in the second embodiment. Since the basic configuration of the operation switch wiring mechanism 1 is similar to that of the second embodiment, like components are denoted by like reference numerals and thus their description will be omitted.

FIG. 8(a) illustrates the relay block 5 of the remote monitoring and control system using the present embodiment. The relay block 5 includes a latching relay in a device body 50. On one surface of the device body 50, four coil terminals 52 connected to set windings and reset windings and an inserting piece 51 formed of a conductive material are protruded. By inserting the inserting piece 51 and the coil terminals 52 into a socket unit provided in main body units 4 and 4' of the parent device 2 and the child device 3, the relay block 5 is electrically and mechanically connected to the main body units 4 and 4' and the main body units 4 and 4' are integral with the relay block 5. Here, a pair of detecting electrodes 41a and 41b is provided in the main body units 4 and 4'. When the relay block 5 is connected to the main body units 4 and 4', the inserting piece 51 is inserted between the detecting electrodes 41a and 41b and the detecting electrodes 41a and 41b are electrically conducted to each other through the inserting piece 51. Accordingly, it can be detected whether the relay block 5 is connected by detecting whether the detecting electrodes 41a and 41b are in a short-circuit state or an open-circuit state.

Furthermore, the parent device 2 always monitors whether the relay block 5 is connected to eight relay sockets provided in the main body unit 4. When it is detected that the relay block 5 is connected, information representing the address of the relay block 5 connected to the operation switch wiring mechanism 1 is transmitted by the transmission signal Vs. In addition, the child device 3 always monitors whether the relay block 5 is connected to four relay sockets provided in the main body unit 4'. When it is detected that the relay block 5 is connected, information representing the address of the relay block 5 connected to the parent device 2 is transmitted by the transmission signal Vs and then transmitted from the child device 2 to the operation switch wiring mechanism 1 by the transmission signal Vs.

Since the parent device 2 and the child device 3 always monitor whether the relay block 5 is connected to the relay socket and the detected result is transmitted to the operation switch wiring mechanism 1 by the transmission signal, in the operation switch wiring mechanism 1, the address can be prevented from being set to the group which is not connected with the relay block 5 using the address setting unit 1c. That is, if the signal inputting unit 1d of the operation switch wiring mechanism 1 receives the address information of the relay block 5 connected to the parent device 2 and the child device 3 from the parent device 2 by the transmission signal Vs, when the address information of the relay block 5 is stored in a memory (not shown) and the setting address is changed by manipulating the switch SW10 upon the address setting, the control unit 1a compares the address information of the relay block 5 stored in the memory with the address setting content, and turns on the corresponding light-emitting diode to display the address setting content when at least one relay block 5 corresponding to the set address is connected. If the relay block 5 corresponding to the set address is not connected, the control unit 1a turns off the corresponding light-emitting diode. By turning off the light-emitting diode, setting error is displayed and a user determines that the relay block 5 of this address is not connected. Accordingly, although the number of the relays increases or decreases due to the layout change, the wrong address can be prevented from being set.

Fourth Embodiment

Figure 10:
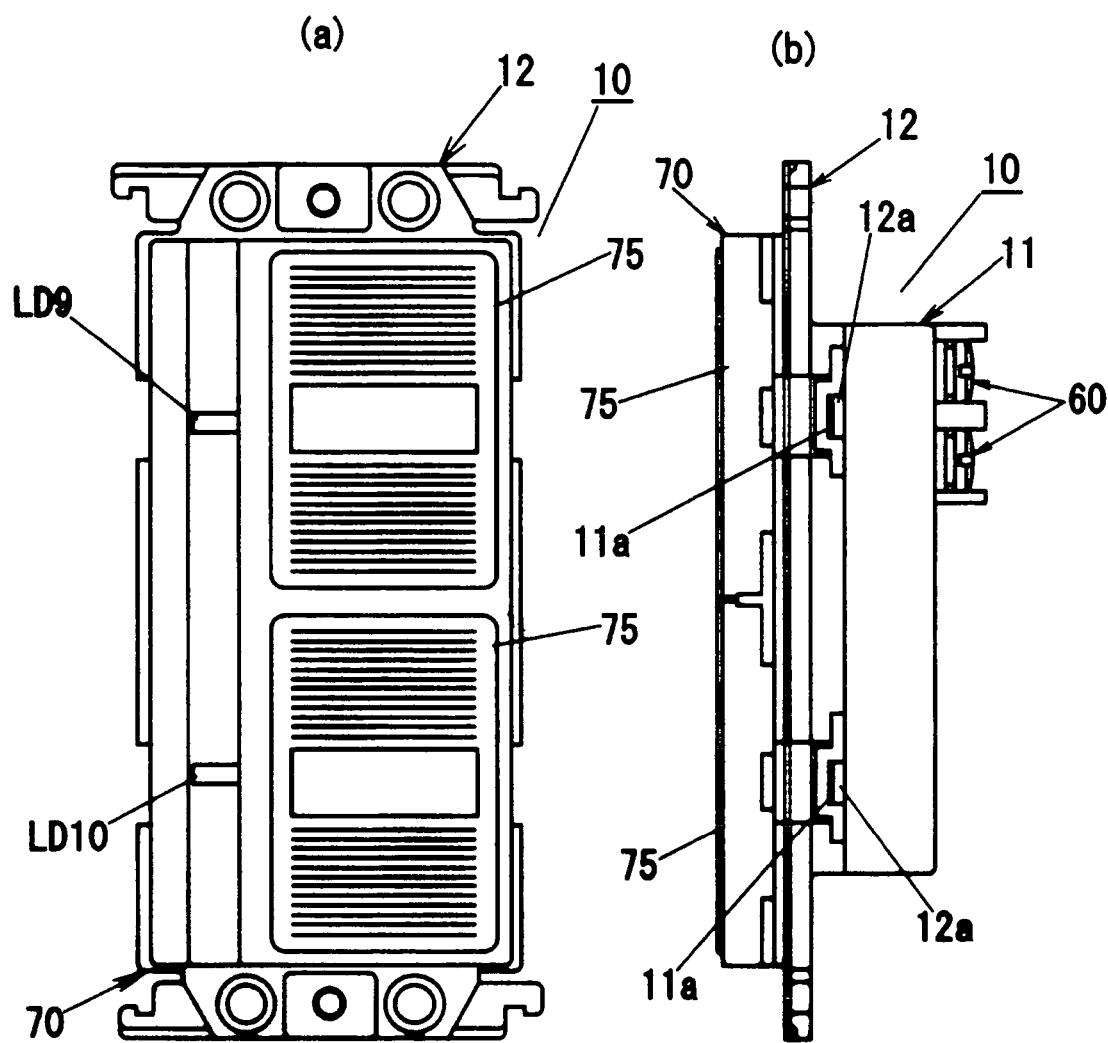
FIG. 10 illustrates the operation switch wiring mechanism according to the fourth embodiment, where
Figure 11:
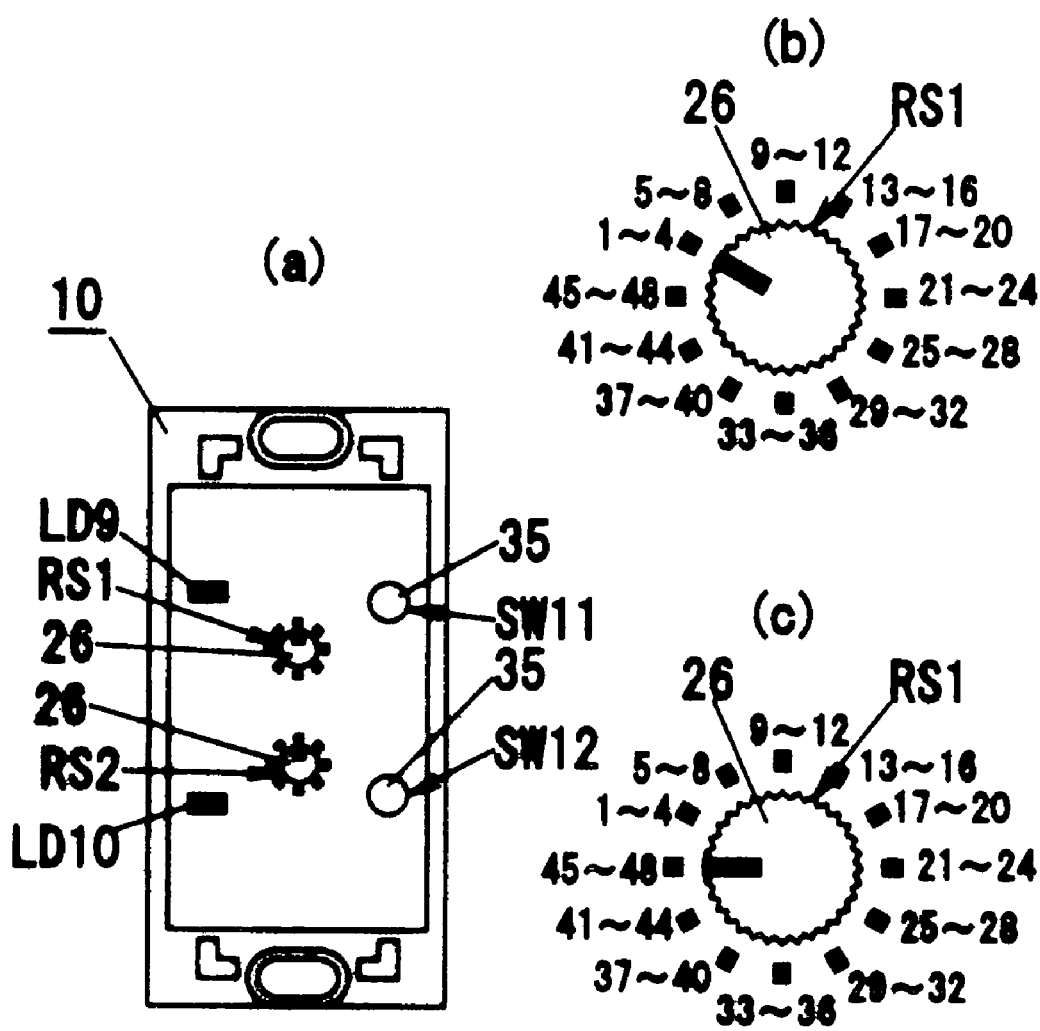
FIG. 11 illustrates the operation switch wiring mechanism according to the fourth embodiment in a state that a face cover is detached, where

A fourth embodiment of the present invention will be described with reference to FIGS. 9 to 11. The present embodiment relates to an operation switch wiring mechanism for performing the group control of the collective control described above. Since the basic configuration thereof is similar to that of the first embodiment, components having different shapes and like functions are denoted by like reference numerals and thus their description will be omitted.

In the present embodiment, a circuit includes an operation inputting unit 1b including an operation switch (hereinafter, referred to as "collective ON operation switch") SW11 for collectively turning on a plurality of relay blocks 5 and an operation switch (hereinafter, referred to as "collective OFF operation switch") SW12 for turning off the plurality of relay blocks 5, an address setting unit 1c including two rotary switches RS1 and RS2, and a display unit 1b including two light-emitting diodes LD9 and LD10 which are provided in correspondence with the collective ON operation switch SW11 and the collective OFF operation switch SW12.

Figure 9:
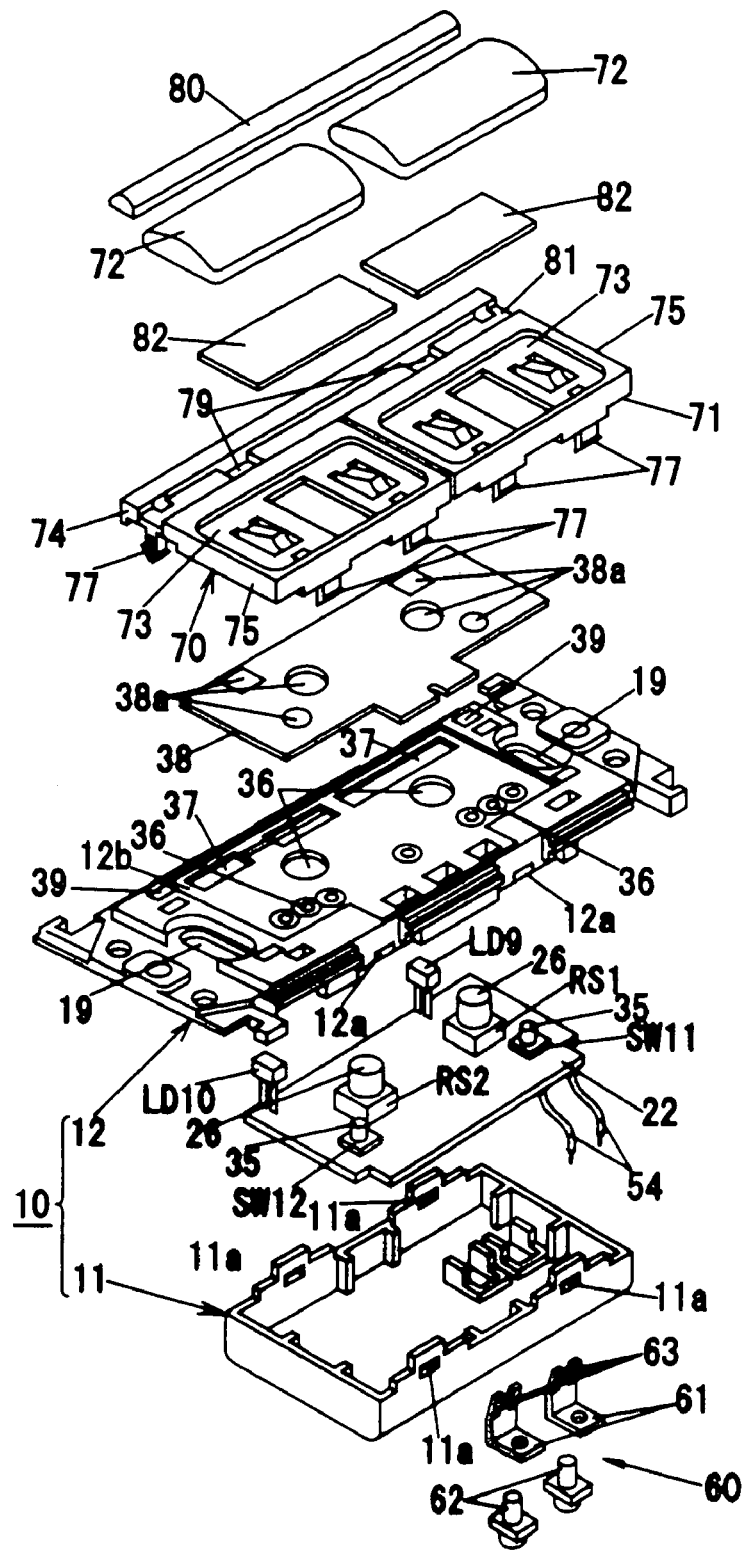
FIG. 9 is an exploded perspective view illustrating an operation switch wiring mechanism according to a fourth embodiment of the present invention.

As shown in FIG. 9, the circuit is mounted on a circuit board 22 and received in a device body 10. The device body 10 is formed by coupling a rectangular parallelepiped body 11 having an opening at the front surface thereof with a cover 12 closing the opening of the body 11. The body 11 and the cover 12 are coupled by coupling assembling claws 12a protruded from the both sides of the cover 12 with assembling holes 11a formed in the both side walls of the body 11. The cover 12 also functions as a series of mounting frames described in the first embodiment. Two terminals 60 for connecting a signal line 105 are exposed in the rear surface of the body 11. The terminal 60 includes a terminal plate 61 having approximately an L-shape and a terminal screw 62 which is set to a horizontal piece of the terminal plate 61 disposed along the rear surface of the body 11. The terminal 60 is fixed to the body 11 by inserting a vertical piece of the terminal plate 61 into a rear wall of the body 11 and caulking leg pieces provided at a front end of the vertical piece. Each of the terminals 60 is connected to the circuit of the circuit board 22 through a lead wire 64.

In the cover 12, perforated holes 36 are formed at positions corresponding to push-button operators 35 of the collective ON operation switch SW11 and the collective OFF operation switch SW12 mounted on the circuit board 22 and at positions corresponding to the operators 26 of the rotary switches RS1 and RS2, and the operators 35 and the operators 26 are protruded to the front surface of the cover 12 through the perforated holes 36. In the cover 12, transmitting holes 37 for exposing the light-emitting diodes LD9 and LD10 corresponding to the collective ON operation switch SW11 and the collective OFF operation switch SW12 are formed. The perforating holes 36 and the transmitting holes 37 are formed in the bottom of a concave portion 12b formed in the front surface of the cover 12 and an identification plate 38 is inserted into the concave portion 12b. Transmitting holes 38a corresponding to the perforated holes 36 and the transmitting holes 37 are formed in the identification plate 38.

Most of the front surface of the cover 12 is covered by a face cover 70. The face cover 70 includes a handle board 71 which is a mold made of a synthetic resin and a handle plate 72 inserted into the concave portion 73 formed in the front surface of the handle board 71. The handle board 71 includes a fixing piece 74 disposed along the left edge of the cover 12 and two rectangular plate-shaped operation handles 75 integrally coupled to the fixing piece 74 through a hinge (not shown). Coupling claws 77 which can be coupled to coupling holes 39 formed in the cover 12 are protruded from the fixing piece 74 and the operation handle 75. The protrusion size of the coupling claw 77 provided at the fixing piece 74 is set such that the fixing piece 74 is prevented from moving against the cover 12 when the coupling claws 77 are coupled to the coupling holes 39, and the protrusion size of the coupling claw 77 provided at the operation handle 75 is set such that the operation handle 75 is fluctuated in a direction that the operation handle 75 is separated from the cover 12 in a state that the coupling claw 77 is coupled to the coupling hole 39. That is, the operation handle 75 is pressurized in a direction separated from the cover 12 by a spring force of the hinge and is retained in the cover 12 by coupling between the coupling claw 77 and the coupling hole 39 in a state that thrust is not applied to the operation handle 75. If the thrust is applied to the operation handle 75, the operation handle 75 approaches the cover 12 centered on the hinge. Accordingly, the thrust is applied to the operators 35 of the collective ON operation switch SW11 and the collective OFF operation switch SW12 by the thrust applied to the operation handle 75 to manipulate the both switches SW11 and SW12.

In the fixing piece 74, perforated holes 79 are formed in correspondence with the transmitting hole 37 of the cover 12. The perforated holes 79 face a concave step portion 41 formed along the length direction of the fixing piece 74. A display cover 80 having transmittance is inserted into the concave step portion 41 and fixed to the handle board 71 using an adhesive. Further, the handle plate 72 is curved such that the center of the horizontal direction of the front surface is more protruded than the both ends, and is inserted into the concave portion 73 provided in the front surface of the operation handle 75.

When assembling the present embodiment, first, the vertical piece of the terminal plate 61 is inserted into the body 11 and the leg piece 63 is caulked such that the terminal plate 61 is fixed to the body 11, and the terminal screw 62 is set to the terminal plate 61. Next, the circuit board 22 and the terminal plate 61 are connected to each other through the lead wire 64, the identification plate 38 is attached to the cover 12, and the cover 12 is coupled to the body 11. Further, the display cover 80 and the handle plate 72 are fixed to the handle board 71. Thereafter, the handle board 71 is coupled to the cover 12.

In the present embodiment, by making the addresses of the collective ON operation switch SW11 and the collective OFF operation switch SW12 correspond to the addresses of the plurality of relay blocks 5 in one-to-multiple correspondence, the plurality of relay blocks 5 can be simultaneously turned on by the manipulation of the collective ON operation switch SW11 or the plurality of relay blocks can be simultaneously turned off by the manipulation of the collective OFF operation switch SW12 (group control). In addition, in the present embodiment, a leading address in a target range of the group control is set by one rotary switch RS1 and a last address in the target range is set by the other rotary switch RS2. For example, if the number of the leading address is 9 and the number of the last address is 32, 24 relay blocks 5 assigned with the addresses of 9 to 32 are collectively turned on/off as the target range of the group control. In the present system, 48 relay blocks 5 can be controlled in relation to one parent device 2, eight relay blocks 5 can be connected to the parent device 2, four relay blocks 5 can be connected to the child device 3, and the addresses (address numbers) of 1 to 48 are assigned to the 48 relay blocks 5 in the order that the relay blocks are connected to the parent device 2. Further, in the present embodiment, eight relay blocks 5 connected to the parent device 2 are divided into two groups four by four, and four relay blocks 5 connected to ten child devices 3 connected to the parent device 2 form one group to generate total 12 groups. That is, there are a group G1 having the address numbers of 1 to 4, a group G2 having the address numbers of 5 to 8, a group G3 having the address numbers of 9 to 12, a group G4 having the address numbers of 13 to 16, a group G5 having the address numbers of 17 to 20, a group G6 having the address numbers of 21 to 24, a group G7 having the address numbers of 25 to 28, a group G8 having the address numbers of 29 to 32, a group G9 having the address numbers of 33 to 36, a group G10 having the address numbers of 37 to 40, a group G11 having the address numbers of 41 to 44, and a group G12 having the address numbers of 45 to 48, and the ranges of the address numbers belonging to the groups G1 to G12 are displayed in the vicinity of the transmitting hole 38a into which the operators 26 of the rotary switches RS1 and RS2 are inserted on the surface of the identification plate 38, in a clockwise direction (see FIG. 11).

Accordingly, the leading address in the target range of the group control is changed to 12 values of 1, 5, 9, 13, 17, 21, 25, 29, 33, 37, 41, and 45 depending on the rotation position of the operator 26 of one rotary switch RS1 and the last address in the target range of the group control is changed to 12 values of 4, 8, 12, 16, 20, 24, 28, 32, 36, 40, 44, and 48 depending on the rotation position of the operator 26 of the other rotary switch RS2. Here, since the groups G3 to G12 correspond to ten child device 3 in one-to-multiple correspondence, setting any one of the groups G3 to G12 by the rotary switches RS1 and RS2 is identical to setting any two of ten child devices 3 connected to the parent device 2 to the leading address and the last address in the target range of the group control. In addition, in FIG. 11, the address number of the leading address in the target range of the group control is set to 1 by one rotary switch RS1, the address number of the last address in the target range of the group control is set to 48 by the other rotary switch RS2, and 48 relay blocks 5 of the system are all included in the target range of the group control.

Furthermore, when the collective ON operation switch SW11 or the collective OFF operation switch SW12 is pressed by pressing the operation handle 71 of the face cover 70, the manipulation input is given from the pressed operation switches SW11 and SW12 to the control unit 1a, and a plurality of addresses included in the target range of the group control are transmitted from the signal outputting unit 1e to the parent device 2 by the transmission signal Vs as monitoring data after the above-described interrupt process. At this time, in the parent device 2, if the address included in the received transmission signal Vs is identical to the address of the relay block 5 connected to the parent device 2, the ON/OFF state of the plurality of relay blocks 5 is controlled, and, otherwise, a control signal is transmitted to one or a plurality of corresponding child devices 3, and the ON/OFF state of the relay blocks 5 having the plurality of corresponding addresses is controlled by each child device 3. Thereafter, since the control state of the corresponding relay block 5 is carried from the parent device 2 to the operation switch wiring mechanism 1, the control unit 1a turns on/off the light-emitting diodes LD9 and LD10 corresponding to the pressed collective ON operation switch SW11 or collective OFF operation switch SW12 to display the ON/OFF state of the relay block 5 (that is, ON/OFF state of the load 6).

As described above, in the present embodiment, since the combination of the addresses of the relay blocks 5, which correspond to the collective ON operation switch SW11 and the collective OFF operation switch SW12 in one-to-multiple correspondence, is variously changed depending on the rotation position of the operators 26 of two rotary switches RS1 and RS2 is variously changed, the address in the target range of the group control can be easily changed by detaching the face cover 70 and manipulating the operators 26 of the rotary switches RS1 and RS2. Also, since the operators 26 of the rotary switches RS1 and RS2 are detachably covered by the face cover 70 including the operation handle 75 and hidden by the face cover 70 in a period except the setting period, the address setting can be prevented from being changed due to wrong manipulation or mischief.

Figure 12:
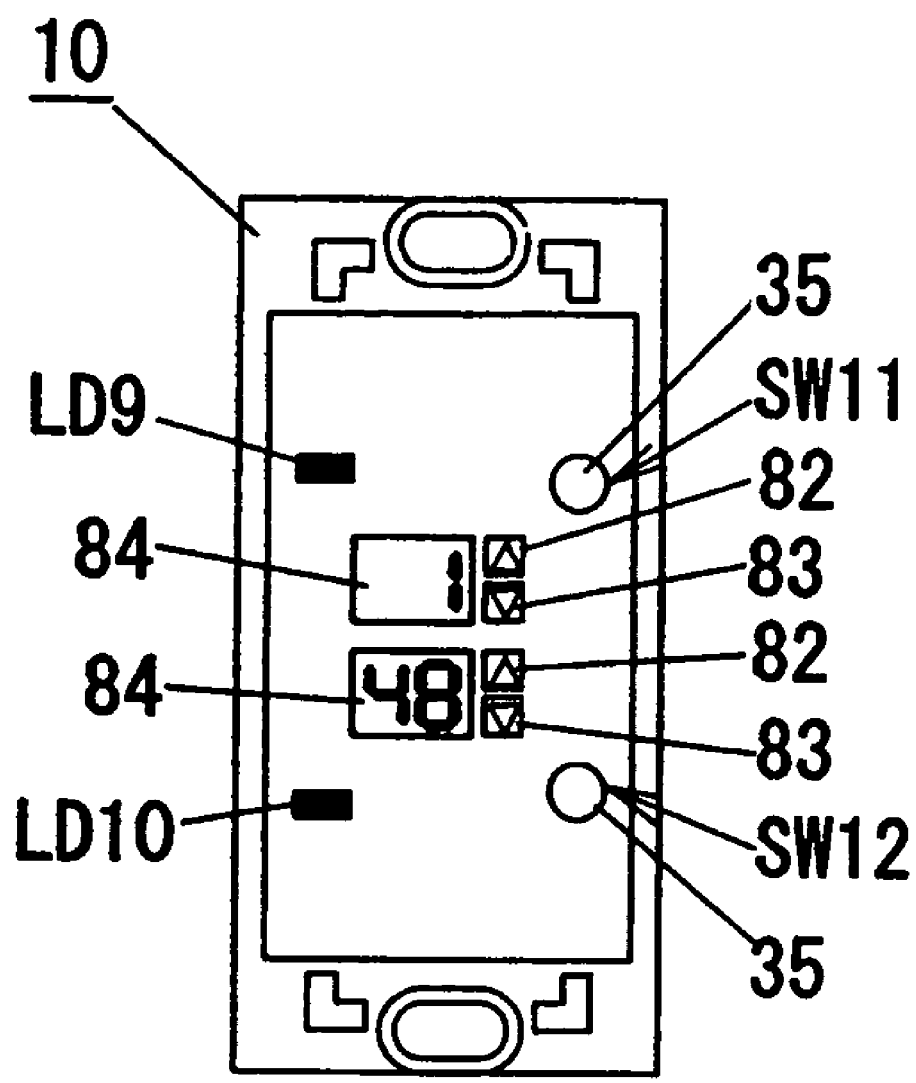
FIG. 12 is a partial front view illustrating a different structure of the fourth embodiment in the state that the face cover is detached.

Here, instead of the rotary switches RS1 and RS2, as shown in FIG. 12, if an up key 82 and a down key 83, and a LED display 84 which has seven segments and digitally displays the address number set by pressing the up key 82 and the down key 83 in two digits are provided in the address setting unit 1c by two sets, any one of address numbers of 1 to 48 can be set as the leading address or the last address in the target range of the group control.

Figure 13:
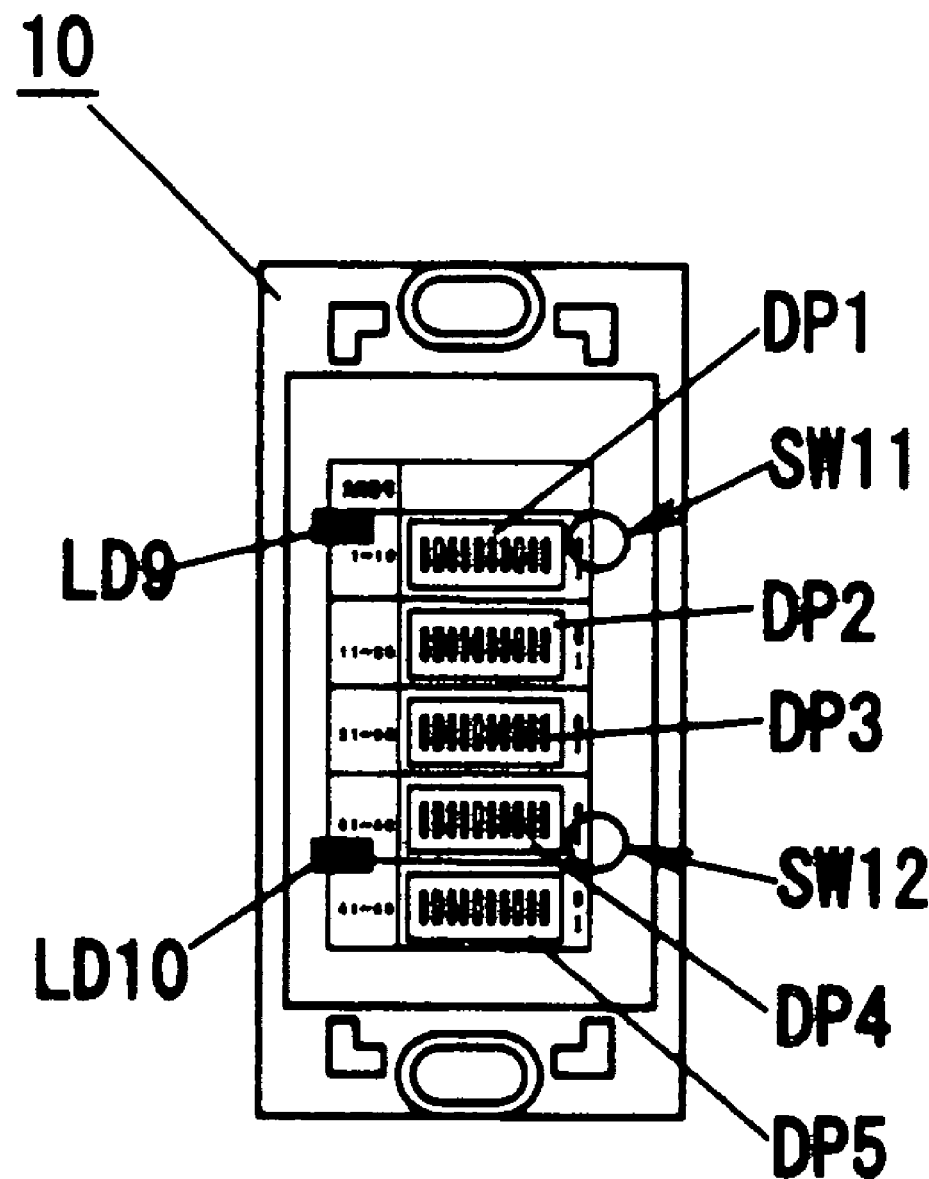
FIG. 13 is a partial front view illustrating another different structure of the fourth embodiment in the state that the face cover is detached.

Alternatively, as shown in FIG. 13, if the address setting unit 1c is composed of a plurality (five) of deep switches DP1 to DP5, and a plurality (ten) of poles of the deep switches DP1 to DP5 are assigned to the address numbers of 1 to 48 in sequential. For example, if the address is included in the target range of the group control when the pole is changed to "1", the target range of the group control need not be set to continuous address numbers, and thus the setting freedom degree increases.

In addition, although, in the above-described embodiments, the number of the child devices 3 is 10 in maximum, the number of the relay blocks 5 connected to the parent device 2 is 8 in maximum, the number of the relay blocks 5 connected to the child device 3 is 4 in maximum, and the number of the relay blocks 5 connected to the entire system is 48, the number of the child devices 3, the number of the relay blocks 5 are limited to these, and are adequately determined depending on a use condition such as the use of the system or the number of the loads. In the system shown in FIG. 6, only one operation switch wiring mechanism 1 is connected. However, the operation switch wiring mechanism 1 may be connected in plural (six in maximum) and the addresses of the operation switch wiring mechanisms 1 are set to different addresses using the address setting unit 1c.

In the conventional remote monitoring and control system, the addresses of the operation terminal 101 and the control terminal 102 are composed of a channel which is set using the terminal as a unit and a load number identifying the operation switch 103 and the circuit of the load, and, in a product having the current state, the channel is set to total 64 channels of 0 to 63 and the load number is set to four circuits of each channel. That is, the channel is set to each operation terminal 101 and each control terminal 102, each operation terminal 101 can include four operation switches 103 in maximum, and each control terminal 102 can be connected with four loads in maximum. Accordingly, in the individual control, total 256 circuits of the load can be controlled. The correspondence between the operation switch 103 and the load is set in a control table provided in the memory of the transmission unit 100. That is, upon the construction, a desired load can be controlled in the manipulation of the operation switch 103 by setting the address to each operation terminal 101 and each control terminal 102 and setting the correspondence between the operation switch 103 and the load in the control table. Here, when the correspondence between the operation switch 103 and the load in the individual control allows the same addresses to correspond to each other and the address is set to the operation terminal 101 and the control terminal 102, the correspondence between the operation switch 103 and the load is automatically set. The operation terminal 101 and the control terminal 102 are identified from each other by data of the terminal type.

Figure 14:
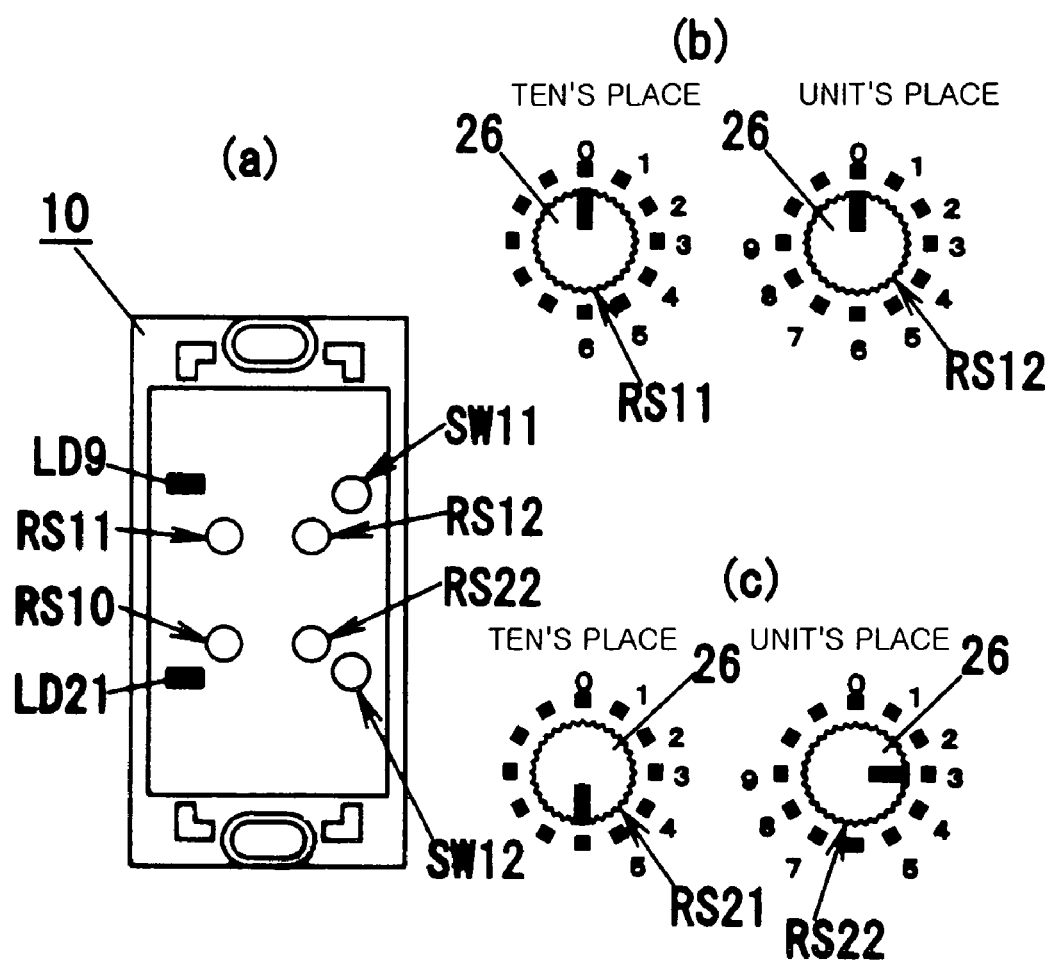
FIG. 14 illustrates a different structure of the fourth embodiment in the state that the face cover is detached, where
Figure 15:
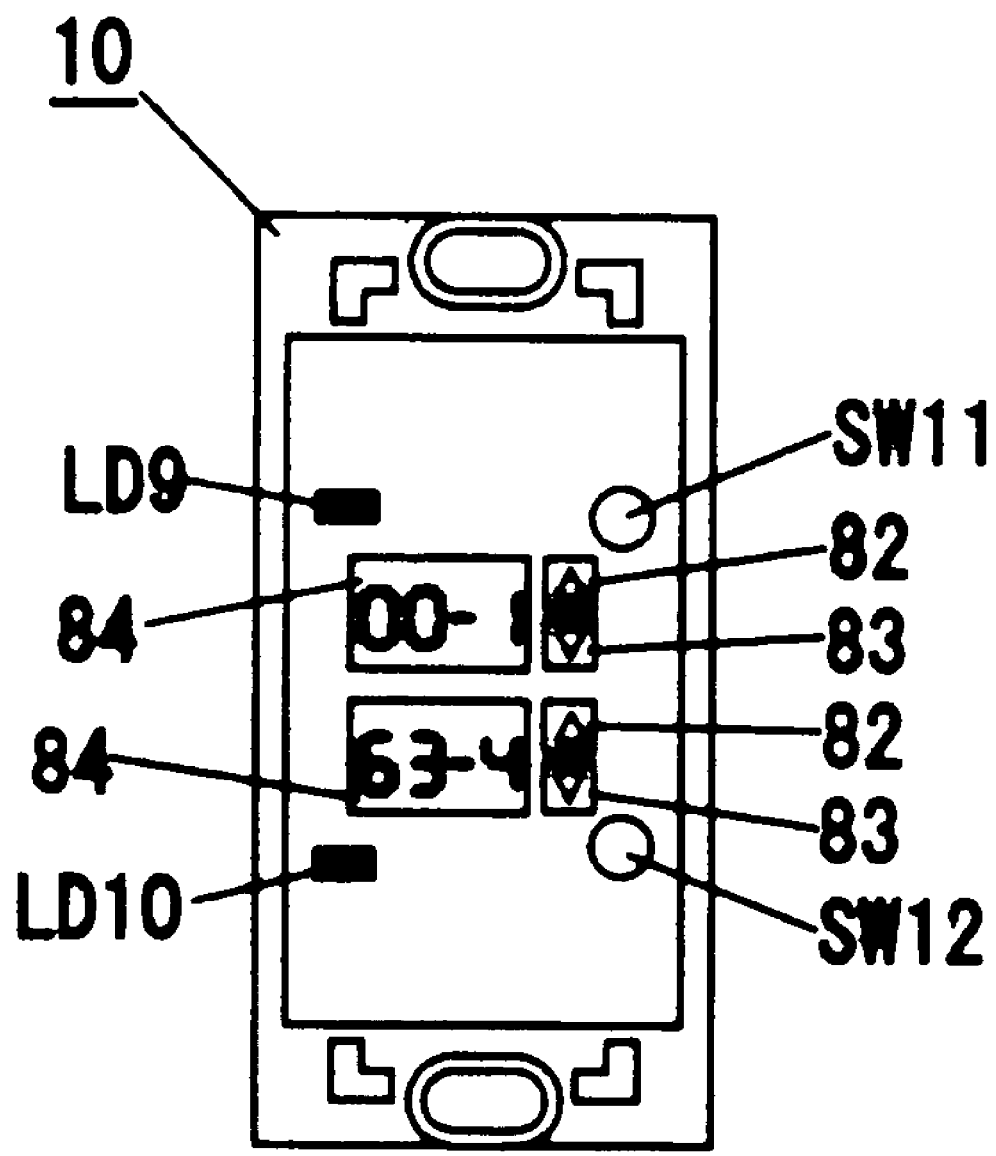
FIG. 15 is a partial front view illustrating another different structure of the fourth embodiment in the state that the face cover is detached.

Furthermore, in the operation switch wiring mechanism 1 corresponding to the operation terminal 101 in the above-described conventional system, as shown in FIG. 14, if the address setting unit 1c including two rotary switches RS11 and RS12 which set ten's place and unit's place of the channel corresponding to the leading address in the target range of the group control, respectively, and two rotary switches RS21 and RS22 which set ten's place and unit's place of the channel corresponding to the last address in the same target range, respectively, is provided, or, instead of the rotary switches RS11, RS12, RS21, and RS22, as shown in FIG. 15, the address setting unit 1c including the up key 82 and the down key 83 and the LED display 84 which has seven segments and digitally displays the load number and the channel set by pressing the up key 82 and the down key 83 is provided, the similar effect can be obtained.

According to the first embodiment, since a plurality of operation switches are arranged on the front surface of a device body and a combination of the addresses of operation switches is alternatively selected from a plurality of combinations using an address setting unit, the relays of the number obtained by the number of the operation switches by the number of the combinations of the addresses can be manipulated by one operation switch wiring mechanism by changing the setting of the address setting unit. In addition, since the address setting unit is detachably covered by a face cover, the wrong address can be prevented from being set due to malfunction or mischief by covering the address setting unit by the face cover in a period except a setting period. Further, since the device body of the operation switch wiring mechanism is formed at the substantially same size as the size (three-module size) of three flush type wiring mechanisms of unit size which are arranged in the short width direction, the operation switch wiring mechanism can be more miniaturized, compared with the conventional selector switch.

According to the second embodiment, since the address setting content due to the address setting unit is confirmed by the display of a display means, wrong address can be prevented from being set.

According to the third embodiment, since a means which compares received address information of the relay with an address set by the address setting unit and displays setting error when the relay corresponding to the set address does not exist is included, by displaying the setting error when the address which the corresponding relay does not exist is set, wrong address can be prevented from being set although the number of the relays increases or decreases due to the layout change.

According to the fourth embodiment, since the combination of the addresses of a plurality of relays and the addresses of the operation switches can be alternatively selected using the address setting unit, by changing the setting of the address setting unit, the addresses of the plurality of relays which are collectively turned on/off by the operation switch can be set by only the operation switch wiring mechanism. Also, since the address setting unit is detachably covered by a face cover including an operation handle for manipulating the operation switch, the wrong address can be prevented to be set due to malfunction or mischief by covering the address setting unit by the face cover.

According to the fifth embodiment, since leading and last addresses in the address range of the relays which are collectively turned on/off by the operation switch can be manually set by the address setting unit, the address setting can be easily performed.

According to the sixth embodiment, since the addresses of the relays which are turned on/off by the operation switch are individually and manually by the address setting unit, the address setting can be more precisely and freely performed, compared with the fifth embodiment.

The present disclosure relates to subject matter contained in Japanese Application No. 2004-311497, filed on Oct. 26, 2004, the contents of which are herein expressly incorporated by reference in its entirety.

What is claimed is:

1. An operation switch wiring mechanism used in a remote monitoring and control system in which the operation switch wiring mechanism for monitoring ON/OFF of operation switches assigned with individual addresses and a remote control wiring mechanism for controlling ON/OFF of relays assigned with individual addresses are connected to each other through a signal line, the operation switch wiring mechanism outputs a transmission signal including address information and operation information due to the manipulation of the operation switches, and the remote control wiring mechanism turns on/off the relay having the address corresponding to the address of the operation switch, comprising:
a device body having a substantially same size as a size of three wiring mechanisms of unit size which are arranged in a short width direction and can be attached to a series of mounting frames standardized for a flush type wiring mechanism, and recessed in a construction surface such that a front surface of the device body is exposed,
wherein a plurality of operation switches, which are individually assigned with addresses corresponding to the addresses of the relays and an address setting unit which alternatively selects a combination of the addresses of the operation switches, are disposed at the front surface of the device body, a signal processing unit, which transmits the transmission signal including the operation information due to the manipulation of the operation switch and the address information of the manipulated operation switch to the signal line, is received in the device body, and an openable and closable face cover for covering at least the address setting unit and exposing at least one of the plurality of operation switches when the face cover is closed is detachably attached to the front surface of the device body.

2. The operation switch wiring mechanism according to claim 1, wherein a display that displays an address setting content due to the address setting unit is mounted on the front surface of the device body.

3. The operation switch wiring mechanism according to claim 1, further comprising:
a receiver that receives address information of the relay, which is transmitted by the transmission signal through the signal line, connected to the remote control wiring mechanism; and
a comparator that compares the received address information of the relay with the addresses of the plurality of operation switches set by the address setting unit and displays a setting error when the relay having the address corresponding to the set address does not exist.

4. The operation switch wiring mechanism according to claim 1, wherein the operation switch is assigned with the address corresponding to the addresses of the plurality of relays in one-to-multiple correspondence, and the face cover includes an operation handle for manipulating the operation switch.

5. The operation switch wiring mechanism according to claim 1, wherein the address setting unit alternatively selects a combination of a first address, a last address, and at least one address which exists between the first address and the last address among the addresses of the relays, and the first address and the last address are individually and manually set.

6. The operation switch wiring mechanism according to claim 1, wherein the address setting unit manually sets correspondence between the addresses of the operation switches and all the addresses of the relays.

7. The operation switch wiring mechanism according to claim 2, further comprising:
a receiver that receives address information of the relay, which is transmitted by the transmission signal through the signal line, connected to the remote control wiring mechanism; and
a comparator that compares the received address information of the relay with the addresses of the plurality of operation switches set by the address setting unit and displays a setting error when the relay having the address corresponding to the set address does not exist.

8. The operation switch wiring mechanism according to claim 2, wherein the address setting unit alternatively selects a combination of a first address, a last address, and at least one address which exists between the first address and the last address among the addresses of the relays, and the first address and the last address are individually and manually set.

9. The operation switch wiring mechanism according to claim 3, wherein the address setting unit alternatively selects a combination of a first address, a last address, and at least one address which exists between the first address and the last address among the addresses of the relays, and the first address and the last address are individually and manually set.

10. The operation switch wiring mechanism according to claim 7, wherein the address setting unit alternatively selects a combination of a first address, a last address, and at least one address which exists between the first address and the last address among the addresses of the relays, and the first address and the last address are individually and manually set.

11. The operation switch wiring mechanism according to claim 1, wherein the address setting unit comprises a single unit that is operated by an operator.

12. The operation switch wiring mechanism according to claim 1, wherein the address setting unit is provided separately from the plurality of operation switches.

* * * * *